(12) United States Patent
Shin et al.

(10) Patent No.: US 8,643,804 B2
(45) Date of Patent: Feb. 4, 2014

(54) BACKLIGHT UNIT AND DISPLAY DEVICE

(71) Applicant: LG Electronics Inc., Seoul (KR)

(72) Inventors: Hyunkwon Shin, Seoul (KR);
Sangcheon Kim, Seoul (KR); Moongoo Choi, Seoul (KR); Seongman Jeon, Seoul (KR); Hyunho Lee, Seoul (KR); Joodo Park, Seoul (KR); Ilhwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/718,914

(22) Filed: Dec. 18, 2012

(65) Prior Publication Data

US 2013/0182413 A1 Jul. 18, 2013

Related U.S. Application Data

(63) Continuation of application No. 12/860,763, filed on Aug. 20, 2010, now Pat. No. 8,355,093.

(60) Provisional application No. 61/314,603, filed on Mar. 17, 2010.

(30) Foreign Application Priority Data

Mar. 16, 2010 (KR) .......................... 10-2010-0023387
Apr. 21, 2010 (KR) .......................... 10-2010-0036926

(51) Int. Cl.
*G02F 1/1335* (2006.01)
(52) U.S. Cl.
USPC .................. 349/61; 349/58; 349/59; 349/60; 349/62; 349/63

(58) Field of Classification Search
USPC ........................ 349/56, 58, 59, 60, 61, 62, 63
See application file for complete search history.

(56) References Cited

U.S. PATENT DOCUMENTS

| 6,167,182 | A | 12/2000 | Shinohara et al. |
| 7,602,466 | B2 * | 10/2009 | Kang ............................ 349/141 |
| 7,731,394 | B2 | 6/2010 | Suzuki et al. |
| 7,819,542 | B2 | 10/2010 | Sato |
| 8,253,894 | B2 | 8/2012 | Ohmi et al. |
| 2006/0256255 | A1 | 11/2006 | Minami |
| 2007/0183136 | A1 | 8/2007 | Park et al. |

(Continued)

FOREIGN PATENT DOCUMENTS

| CN | 1678866 A | 10/2005 |
| JP | 2006-236771 A | 9/2006 |

(Continued)

*Primary Examiner* — Jennifer Doan
(74) *Attorney, Agent, or Firm* — Birch, Stewart, Kolasch & Birch, LLP

(57) ABSTRACT

A light generating device which may be used as a backlight unit and a display device including the light generating device are discussed. According to an embodiment, the light generating device can include a base layer; light source devices disposed on the base layer and configured to emit light, the light source devices being spaced apart from each other, at least one of the light source devices including a light emitting diode for generating the light; and a light shielding layer covering the light source devices and configured to control an amount of the light being transmitted through the light shielding layer, wherein the light shielding layer includes slits disposed spaced apart from each other.

15 Claims, 28 Drawing Sheets

(56) References Cited

U.S. PATENT DOCUMENTS

| | | |
|---|---|---|
| 2007/0229995 A1 | 10/2007 | Kawato et al. |
| 2007/0263408 A1 | 11/2007 | Chua |
| 2008/0018827 A1* | 1/2008 | Yamamoto et al. ............ 349/64 |
| 2008/0259639 A1 | 10/2008 | Chang |
| 2008/0266872 A1 | 10/2008 | Chang |
| 2009/0290093 A1 | 11/2009 | Shimura et al. |
| 2010/0110330 A1 | 5/2010 | Ajichi et al. |

FOREIGN PATENT DOCUMENTS

| | | |
|---|---|---|
| JP | 2006-318700 A | 11/2006 |
| JP | 2007-042320 A | 2/2007 |
| JP | 2008-123969 A | 5/2008 |
| KR | 10-2009-0073452 A | 7/2009 |
| WO | WO 2008/029540 A1 | 3/2008 |

* cited by examiner

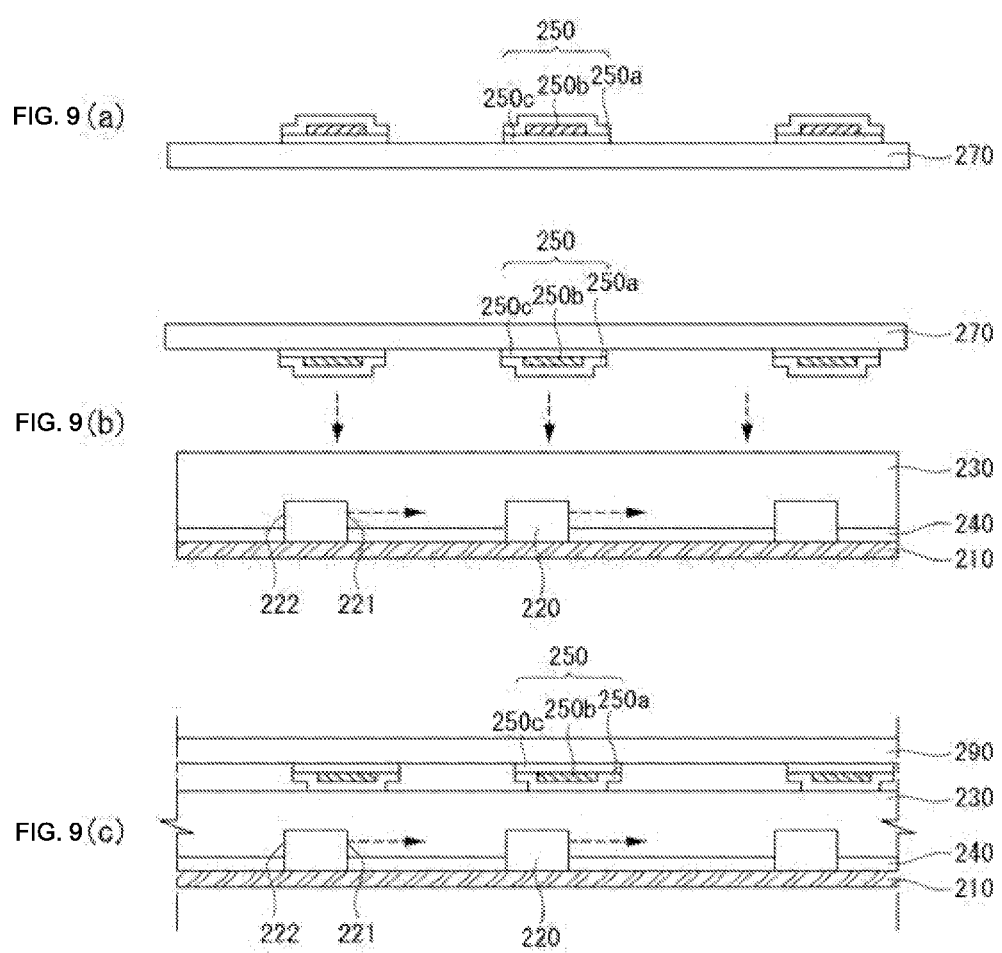

recess hole recess

Laser beam

# BACKLIGHT UNIT AND DISPLAY DEVICE

CROSS-REFERENCE TO RELATED APPLICATIONS

The present application is a 37 C.F.R. §1.53(b) continuation of co-pending application Ser. No. 12/860,763 filed Aug. 20, 2010, which claims the benefit of U.S. Provisional Application Nos. 61/314,603 filed on Mar. 17, 2010, and claims priority to Patent Application Nos. 10-2010-0023387 filed in Republic of Korea on Mar. 16, 2010, and 10-2010-0036926 filed in Republic of Korea on Apr. 21, 2010. The entire contents of all of the above applications are hereby incorporated by reference.

BACKGROUND OF THE INVENTION

1. Field of the Invention

Exemplary embodiments of the invention relate to a backlight unit and a display device.

2. Description of the Related Art

In general, a typical large-sized display device includes a liquid crystal display (LCD), a plasma display panel (PDP), and the like. Unlike the self-emission type PDP, the LCD needs a backlight unit because it generally does not have a light emitting device.

A backlight unit used in the LCD may be divided into an edge type backlight unit and a direct type backlight unit depending on where light sources are disposed. In the edge type backlight unit, light sources are disposed at the left and right sides or upper and lower sides of an LCD panel and a light guide plate is used to propagate the light emitted from the light sources, thereby obtaining light uniformity and allowing the panel to become ultra-thin.

The direct type backlight unit is used for a 20 inch or larger display. In the direct type backlight unit, a plurality of light sources are disposed under a panel and have superior light efficiency than the edge type backlight unit. Thus, the direct type backlight unit is commonly used for a large-scale display.

Conventional edge type backlight units or direct type backlight units employ cold cathode fluorescent lamps (CCFLs) as light sources.

However, the backlight unit employing CCFLs is disadvantageous because, since power is constantly applied to the CCFLs, a great deal of power is consumed, a color reproduction range (i.e., gamut) is about 70% of that of a CRT, and the addition of mercury causes an environmental pollution. Thus, in an effort to address the problems, currently, research for a backlight unit employing light emitting diodes (LEDs) as a substitute is actively ongoing.

The use of the LEDs for a backlight unit allows for turning on and off a portion of an LED array and can remarkably reduce power consumption. In the case of an RGB LED, a 100% or more of a color reproduction range of an NTSC (National Television System Committee) can be obtained to provide more vivid picture quality. In addition, the LEDs manufactured through a semiconductor process are less harmful to the environment.

Some LCD products employing the LEDs as a backlight unit having the foregoing advantages have been launched, but because their driving mechanisms are different from that of the existing CCFL light source, the driver, PCB, and the like for such products are expensive and may not be cost effective. Thus, conventionally the LED backlight unit is employed only for high-priced LCD products.

SUMMARY OF THE INVENTION

Exemplary embodiments of the invention provide a backlight unit and a display device.

Embodiments of the invention provide a light generating device including one or more light source devices each including a light emitting unit such as an LED, which can be used in a backlight unit or other device and which address the limitations and disadvantages associated with the background art.

According to an embodiment, the invention provides a light generating device comprising: a first layer; a plurality of light source devices disposed on the first layer and configured to emit light, at least one of the light source devices including a light emitting diode for generating the light; a second layer covering the light source devices; and first and second light shielding layers disposed on the second layer and configure to selectively transmit the light emitted from the light source devices, the first and second light shielding layers being composed of different materials, the first and second light shielding layers being disposed to correspond with the light source devices.

According to an embodiment, the invention provides a light generating device comprising: a first layer; a plurality of light source devices disposed on the first layer and configured to emit light, at least one of the light source devices including a light emitting diode for generating the light; a second layer covering the light source devices; and a light shielding layer disposed on the second layer and configure to selectively transmit the light emitted from the light source devices, the light shielding layer including a plurality of holes, wherein widths of the holes of the light shielding layer increase in a light emission direction.

According to an embodiment, the invention provides a light generating device comprising: a first layer; a plurality of light source devices disposed on the first layer and configured to emit light, at least one of the light source devices including a light emitting diode for generating the light; a second layer covering the light source devices; and a light shielding layer disposed on the second layer and configure to selectively transmit the light emitted from the light source devices, the light shielding layer including a plurality of through holes.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 9(a)-9(c) are sectional views showing the sequential process of a method for manufacturing a backlight unit having the light shielding layer with the three-layered structure according to an embodiment of the invention;

DETAILED DESCRIPTION OF THE EMBODIMENTS

Reference will now be made in detail embodiments of the invention examples of which are illustrated in the accompanying drawings. In this regard, each of all display devices, backlight units, light source devices, and any device that includes such backlight unit or light source device discussed below is operatively coupled and configured. Further, a backlight unit according to embodiments of the invention can be an edge type or a direct type as applicable. Furthermore, such a backlight unit preferably includes a plurality of light sources which are disposed in arrays, lines, patterns, etc.

In these figures, arrows indicate a general light emitting direction of the light source, e.g., a general direction in which the light from a light emitting surface of the light source is emitted, but the light from the light source may emit not necessarily in a single line but through an area in the indicated direction.

According to various embodiments of the invention, any one or more features from one embodiment/example/variation of the invention can be applied to (e.g., added, substituted, modified, etc.) any one or more other embodiments/examples/variations discussed below according to the invention. Further any operations/methods discussed below can be implemented in any of these devices/units or other suitable devices/units.

Figure 1A:
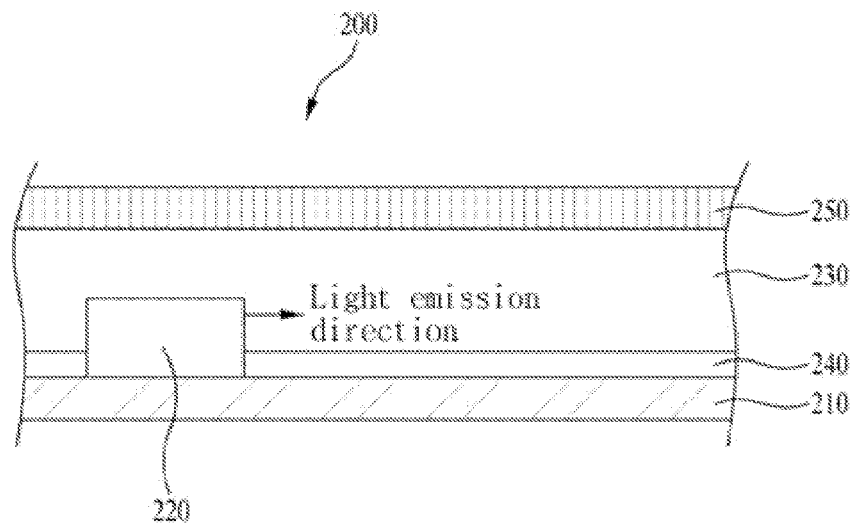
FIGS. 1A and 1B illustrate examples of a backlight unit according to an exemplary embodiment of the invention.
Figure 1B:
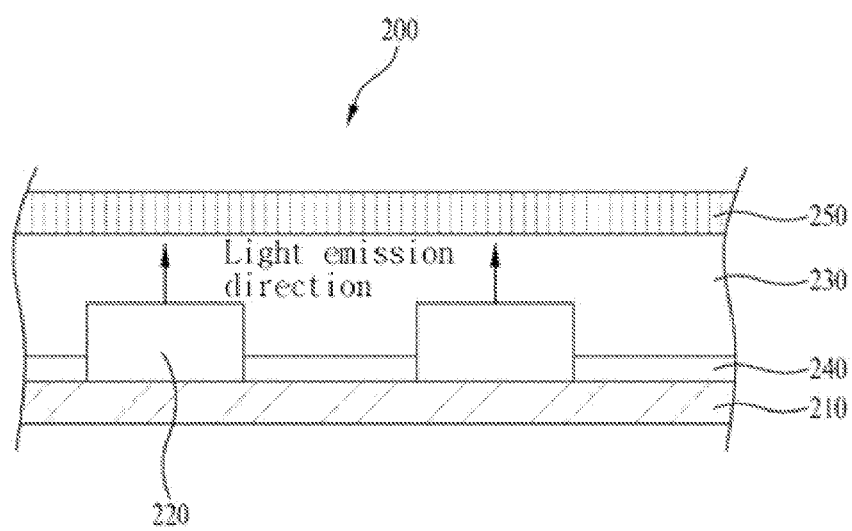

FIGS. 1A and 1B illustrate examples of a backlight unit according to an exemplary embodiment of the invention. Specifically, FIG. 1A illustrates a backlight unit having light sources 220 that emit light in lateral directions, which may be used in an edge or direct type optical system, and FIG. 1B illustrates a backlight unit having light sources 220 that emit light vertically, which may be used in an edge or direct type optical system.

As shown in FIGS. 1A and 1B, a backlight unit 200 may comprise a first layer 210, a light source 220, a second layer 230, a reflection layer 240, and a light shielding layer 250.

Here, a plurality of light sources 220 are formed on the first layer 210, and the second layer 230 is disposed at an upper side of the first layer 210 to cover the plurality of light sources 220. For instance, the second layer 230 encapsulates (e.g., completely covers) the light sources 220 disposed on the first layer 210.

The first layer 210 may be a board (or a substrate) on which the plurality of light sources 220 are mounted or formed, and an electrode pattern may be formed on the first layer 210 in order to connect an adapter for supplying power and the light sources 220. For example, a carbon nano-tube (CNT) electrode pattern for connecting the light sources 220 and the adapter may be formed on the upper surface of the substrate.

The first layer 210 may be a PCB made of polyethylene terephthalate (PET), glass, polycarbonate (PC), silicon (Si), and the like, on which the plurality of light sources 220 are mounted or disposed. The first layer 210 may be formed in the form of a film.

The light sources 220 may be one of a light emitting diode (LED) chip and an LED package comprising at least one LED chip.

In the present exemplary embodiment, a case in which the light sources 220 are an LED package will be described as an example.

The LED package constituting the light sources 220 may be classified into a top view type LED package and a side view type LED package depending on the direction in which a light emitting surface points to. FIG. 1A illustrates the side view type LED package in which a light emitting surface is formed to point toward a lateral side, and FIG. 1B illustrates the top view type LED package in which a light emitting surface is formed to point toward an upper side.

The light sources according to an exemplary embodiment of the invention may be configured by using at least one of the side view type light sources and the top view type light sources. For instance, in one backlight unit, all side view type light sources may be used, all top view type light sources may be used, or a combination of the side and top view type light sources may be used.

In an exemplary embodiment of the invention, in case of the LED package having the side view type light sources 220, as shown in FIG. 1A, a light emitting surface of at least one of the plurality of light sources 220 is disposed on the lateral side and the plurality of light sources 220 may emit light to the lateral direction, namely, in the direction in which the first layer 210 or the reflection layer 240 extends.

In case of the LED package having the top view type light sources 220, as shown in FIG. 1B, a light emitting surface of at least one of the plurality of light sources 220 is disposed on the upper side and the plurality of light sources 220 may emit light to the upward direction, namely, in the direction of the second layer 230 and the light shielding layer 250.

The light sources 220 may be colored LEDs that emit at least one of red, blue, and green colors, or white LEDs. The colored LEDs may comprise at least one of red LEDs, blue LEDs, and green LEDs. The disposition and emitted light of the LEDs may be variably modified so as to be applicable.

Figure 23:
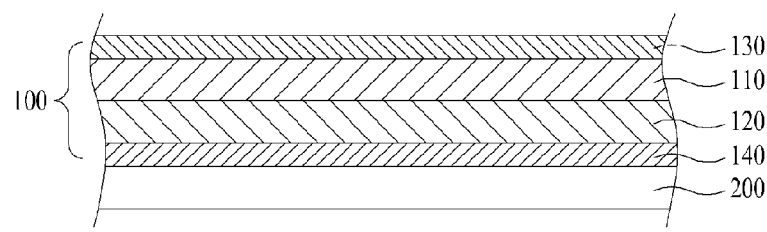
FIG. 23 illustrates an example of a display module including a backlight unit according to an exemplary embodiment of the invention.

The second layer 230 disposed on the first layer 210 and covering the plurality of light sources 220 may allow light emitted from the light sources 220 to transmit therethrough and spread the light, whereby the light emitted from the light sources 220 can be uniformly provided to a display panel 100, e.g., as shown in FIG. 23.

The reflection layer 240 for reflecting light emitted from the light sources 220 may be positioned on the first layer 210. The reflection layer 240 may be formed on an area, of the first layer 210, other than the area where the light sources 220 are formed. For instance, the reflection layer 240 may completely surround the light sources 220 on the first layer 210.

The reflection layer 240 may reflect light emitted from the light sources 220 and reflect again the light (totally) reflected from the boundary of the second layer 230 to make the light to spread widely.

The reflection layer 240 may contain at least one of metal or a metal oxide, a reflective material. For example, the reflection layer 240 may be made of metal or a metal oxide having a high reflectance such as aluminum (Al), silver (Ag), gold (Au) and titanium dioxide ($TiO_2$).

In this case, the reflection layer 240 may be formed by depositing or coating the metal or metal oxide on the first layer 210 or by printing metal ink on the first layer 210.

Here, a vacuum deposition method such as a thermal deposition method, an evaporation method, or a sputtering method may be used as the deposition method, and a printing method, a gravure coating method, or a silk screen method may be used as the coating or printing method.

The second layer 230 positioned on the first layer 210 may be made of a light-transmissive material, e.g., silicon or an acrylic resin. However, the second layer 230 is not limited thereto and may be made of various other resins.

In order to allow the backlight unit 200 to have a uniform luminance when light emitted from the light sources 220 spreads, the second layer 230 may be made of a resin having a refractive index of about 1.4 to 1.6. For example, the second layer 230 may be made of a material selected from among the group consisting of polyethylene terephthalate (PET), polycarbonate (PC), polypropylene (PP), polyethylene (PE), polystyrene (PS), polyepoxy (PE), silicon, acryl, and the like.

The second layer 230 may comprise a polymer resin having an adhesive property so as to be firmly and tightly attached to the light sources 220 and the reflection layer 240. For example, the second layer 230 may be made of acryl group, urethane group, epoxy group, and melamine group such as unsaturated polyester, methyl methacrylate, ethyl methacrylate, isobutyl. methacrylate, n-butyl methacrylate, n-butyl methyl methacrylate, acrylic acid, methacrylic acid, hydroxyl ethyl methacylate, hydroxyl propyl methacrylate, hydroxyl ethyl acrylate, acrylamide, methylol acrylamide, glycidyl methacrylate, ethyl acrylate, isobutyl acrylate, n-butyl acrylate, 2-ethyl hexyl acrylate polymer, copolymer, or terpolymer.

The second layer 230 may be formed by coating a liquid or gel phase resin on the first layer 210 with the plurality of light sources 220 and the reflection layer 240 formed thereon and then hardening the resin. Alternatively, the second layer 230 may be formed by coating a resin on a support sheet, partially hardening it, and then bonding the same on the first layer 210.

The second layer 230 may serve as a light guide plate for guiding the light generated from the light sources 220. Subsequently, the light shielding layer 250 reduces the luminance of light emitted from an area adjacent to the light sources 220, thus serving to allow the light of uniform luminance to be emitted from the backlight unit 200 to the display panel of a display device. That is, the light shielding layer in this embodiment or other embodiments discussed in the present specification can entirely reflect the light so that the light is blocked by the light shielding layer, or can partially transmit light while partially reflecting the light.

Recently, as the backlight unit 200 tends to become thinner, and in this case, the reduction in the thickness of the backlight unit 200 can lead to degradation of light uniformity, To address this, the light shielding layer 250 is provided.

In the backlight unit 200, the area adjacent to the light emitting surface of the light sources 220 is the brightest, while an area distant from the light emitting surface of the light sources 220 is less bright. Thus, the light shielding layer 250 may be manufactured such that its light transmittance increases as it becomes away from the light emitting surface of the light sources 220.

Namely, the light shielding layer 250 does not have the same light transmittance at its entire area but may have a different light transmittance at each area. For example, the area near the light emitting surface of the light sources 220 has a low light transmittance while the area distant from the light emitting surface of the light sources 220 has a high light transmittance Also, the characteristics of a transmittance spectrum of the material used for the light shielding layer 250 may not be uniform in transmitting light colored, which may degrade a color uniformity. In this case, however, if the light transmittance of the light shielding layer is adjusted to be increased in order to minimize a color change of the transmitted light, another problem may arise in that the light shielding capability is likely to deteriorate. Thus, in an exemplary embodiment of the invention, in manufacturing the light shielding layer 250, an appropriate light shielding pattern may be additionally formed in consideration of these limitations.

The light shielding layer 250 according to an exemplary embodiment of the invention may be formed as a single layer whose respective areas have a different light transmittance, or may be formed as a plurality of layers.

Also, the light shielding layer 250 may have a light shielding pattern comprising at least one of a plurality of holes and a plurality of recesses. Here, as for at least one of the holes and recesses, the distance between the adjacent holes, the distance between the adjacent recesses, or the distance between the adjacent hole and recess may be reduced as those become away from the light emitting surface of the light sources 220.

The width of the light shielding pattern of the light shielding layer 250 may be equal or may be gradually reduced as it becomes away from the light emitting surface of the light sources 220.

The thickness of the light shielding layer 250 may be equal or may be gradually reduced as it becomes away from the light emitting surface of the light sources 220. The light shielding layer 250 may be made of at least one of a metal, $TiO_2$, $CaCO_3$, and $ZnO$.

FIGS. 2A to 3C illustrate various examples of positions of a light shielding layer in a backlight unit according to an exemplary embodiment of the invention.

The light shielding layer 250 may be formed such that it is directly supported on the second layer 230 made of a light-transmissive material or in contact with the upper surface of the second layer 230 as shown in FIGS. 1A and 1B, or may be formed under a diffusion layer 260.

For instance, the diffusion layer 260 may be formed on the light shielding layer 250 to allow light to spread upward, and in this case, the diffusion layer 260 may be directly bonded to the light shielding layer 250 or may be bonded by using an adhesive member.

Here, the diffusion layer 260 may serve to spread incident light by preventing light, which comes from the light shielding layer 250, from being partially concentrated, thus making the light luminance more uniform.

Figure 2A:
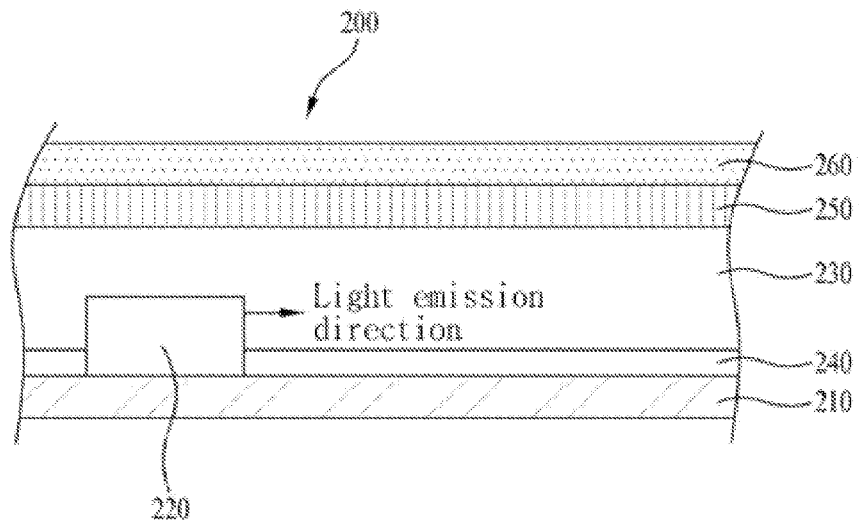
FIGS. 2A to 2C illustrate various examples of positions of a light shielding layer according to an exemplary embodiment of the invention.
Figure 2B:
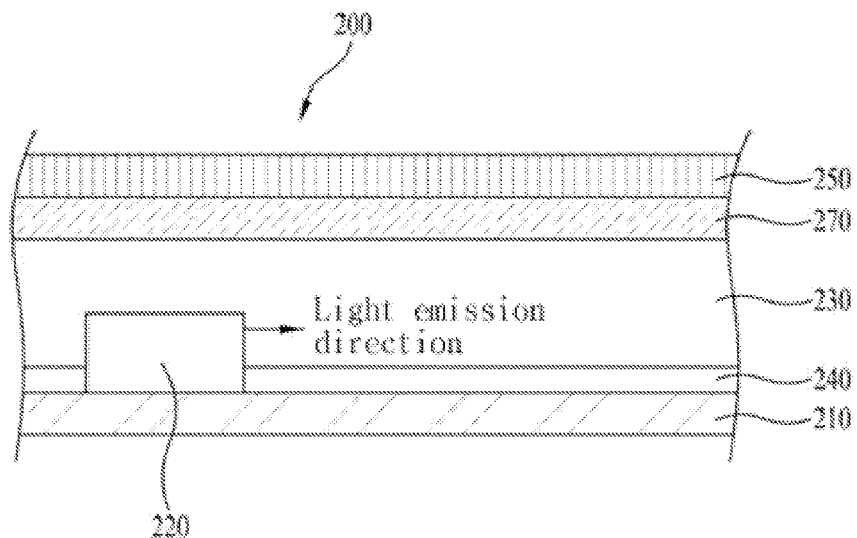
Figure 2C:
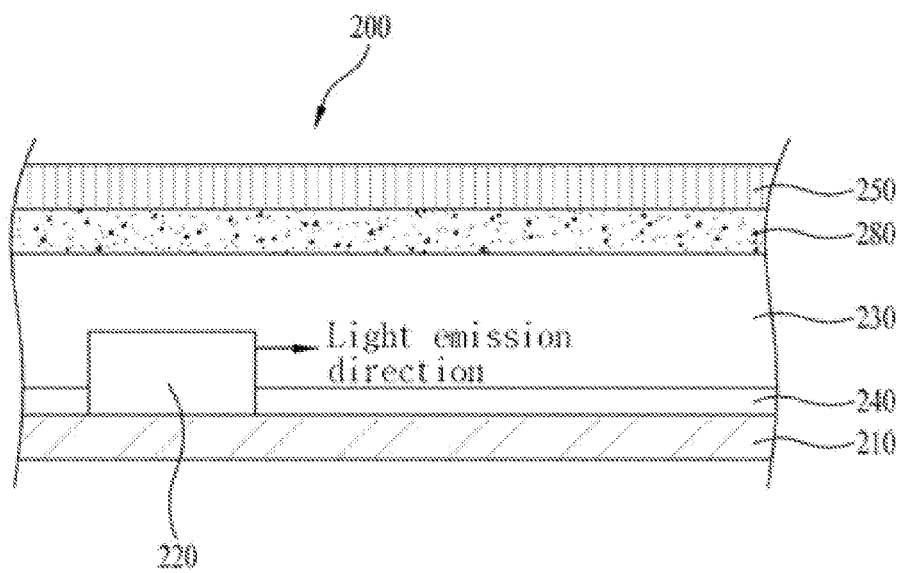

As shown in FIG. 2B, the light shielding layer 250 may be separated from the second layer 230 made of a light-transmissive material, by having a certain space 270 filled with air or gas interposed therebetween, and as show in FIG. 2C, a buffer layer 280 may be additionally formed between the light shielding layer 250 and the second layer 230.

Here, the buffer layer 280 may be the diffusion layer 260 in FIG. 2A, or may be made of a material having a different refractive index from that of the second layer 230. Also, the buffer layer 180 may be an adhesive for improving an adhesive strength between the light shielding layer 250 and the second layer 230 or may be a heat absorption layer remaining when the light shielding pattern of the light shielding layer 250 is manufactured.

Figure 3A:
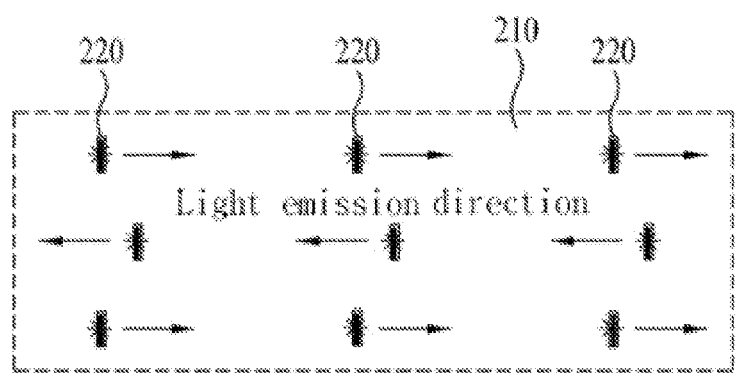
FIGS. 3A and 3B illustrate the distribution of a light transmittance of the light shielding layer according to an arrangement of light sources of the backlight unit according to an embodiment of the invention.
Figure 3B:
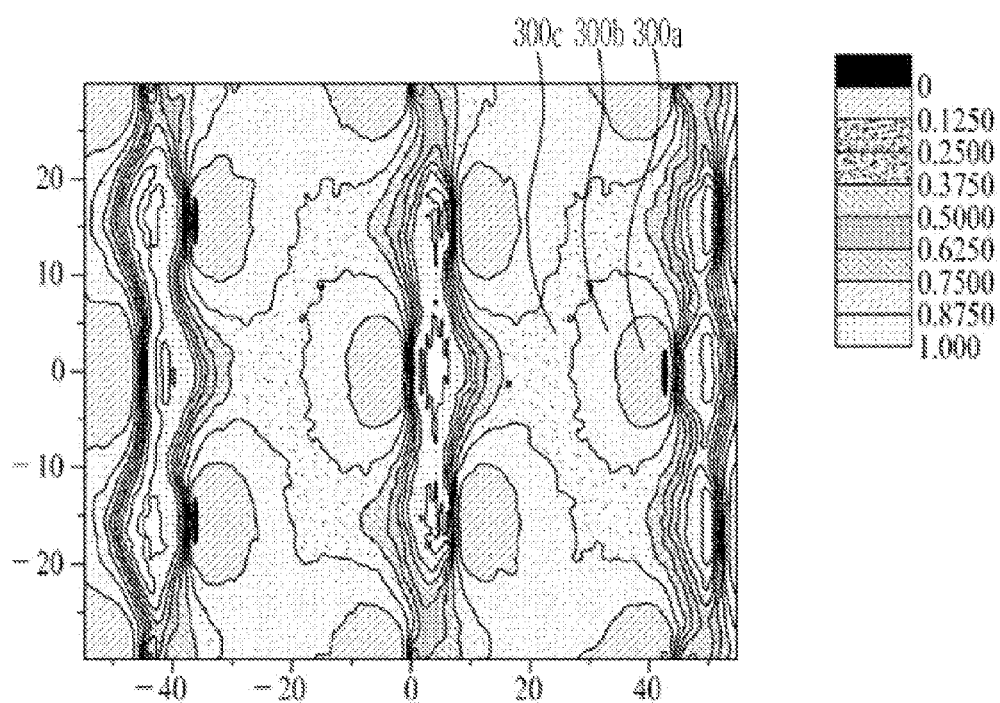

FIGS. 3A and 3B illustrate the distribution of a light transmittance of the light shielding layer according to an arrangement of light sources of the backlight unit. Specifically, FIG. 3A illustrates an arrangement structure of light sources of the backlight unit, and FIG. 3B illustrates the distribution of a light transmittance of the light shielding layer formed at the upper portion of the light sources of FIG. 3A.

As shown in FIG. 3A, the plurality of light sources 220 are disposed on the first layer 210. The adjacent light sources 220 may be arranged to be parallel to each other on the same line or may be arranged in a crisscross manner.

Here, the light emitting surfaces of the light sources 220 may be disposed to point toward the same direction. The light sources 220 positioned on different, adjacent lines may be arranged to be parallel to each other or may be arranged in a crisscross manner.

Here, the light emitting surfaces of the light sources 220 positioned on the same line may point toward the same direction, and the light sources 220 positioned on the adjacent, different lines may be disposed such that their light emitting surfaces point toward the opposite direction. For instance, the light sources 220 arranged along a first line may emit light in a first light emission direction, while the light sources 220 arranged along a second line below the first line may emit light in a second light emission direction which is different or opposite to the first light emission direction.

In an example, the distribution of a light transmission when the light shielding layer 250 is formed at the upper side of the plurality of arranged light sources 220 is shown in FIG. 3B.

As shown in FIG. 3B, assume that an area, nearest to the light emitting surface of the light sources 220, of the upper surface area of the light shielding layer 250 is a first area 300a, an area farthest from the light emitting surface of the light sources 220 is a third area 300c, and an area positioned between the first area 300a and the third area 300c is a second area 300b. In this case, the first area 300a has the lowest light transmittance, the third area 300c has the highest light transmittance, and the second area 300b has a median light transmittance or another light transmittance between those of the first area 300a and the third area 300c.

For instance, because the light transmittance of the area nearest to the light emitting surface of the light sources 220 is lowest and the light transmittance of the area farthest from the light emitting surface of the light sources 220 is the highest, the quantity of light can be adjusted to have the uniform light transmittance degree overall.

Figure 4:
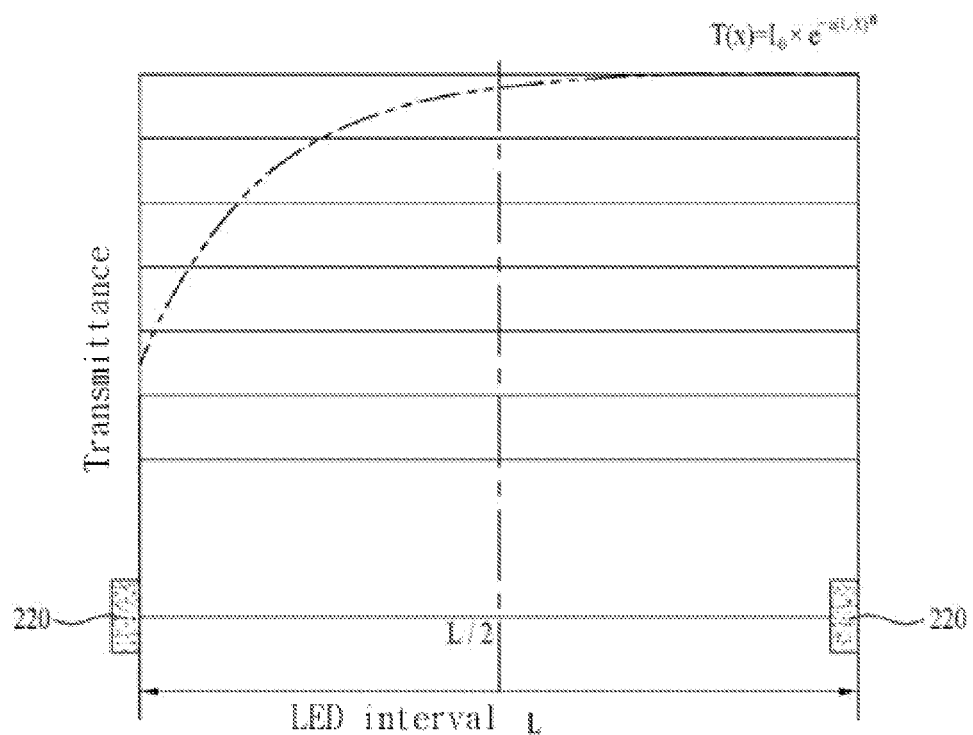
FIG. 4 is a graph showing an example of a light transmittance of the light shielding layer according to the distance between adjacent light sources according to an embodiment of the invention.

FIG. 4 is a graph showing a light transmittance of the light shielding layer of the backlight unit according to the distance between adjacent light sources. As shown in FIG. 4, it is noted that as one moves away from the light emitting surface of the light source 220, the light transmittance of the light shielding layer is gradually increased. Namely, in an exemplary embodiment of the invention, the light shielding layer may be manufactured to have such a light transmittance as shown in FIG. 4.

Here, the light transmittance of the light shielding layer may be adjusted based on an equation shown below:

$$\text{Light transmittance } T(x) = I0 * e - a(L-x)n$$

In the above equation, I0 is the strength of the light sources, 'L' is the interval between the adjacent light sources 220, 'x' is the distance between the light emitting surface of the light sources and a light transmittance measurement area, and 'a' and 'n' are coefficients.

In this manner, the areas of the light shielding layer between the adjacent light sources have different light transmittances, and the different light transmittances may also vary depending on optical designing conditions such as the number of light sources, a reference brightness of the light sources, and the intervals between the light sources.

Thus, in an exemplary embodiment of the invention, different light transmittances are set for the areas of the light shielding layer based on the equation of the light transmittance $T(x) = I0 * e - a(L-x)n$, and the light shielding layer may be manufactured according to the set light transmittances.

Namely, in manufacturing the light shielding layer, the order of setting the light transmittances of the light shielding layer is as follows.

First, the optical designing conditions such as the number of light sources, a reference brightness of the light sources, the intervals between the light sources, and the like, are measured.

Next, light transmittances of the respective areas of the light shielding layer are determined by using the equation $T(x)=I0*e-a(L-x)n$.

And then, the light shielding layer is manufactured in consideration of the thickness of the light shielding layer, the material of the light shielding layer, and the shape of a light shielding pattern of the light shielding layer according to the determined light transmittances.

Figure 5A:
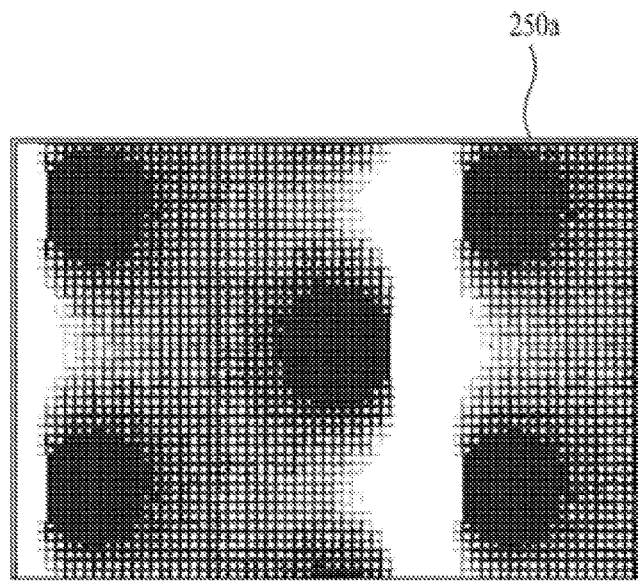
FIGS. 5A and 5B are respectively a plan view and a sectional view showing a light transmittance of a light shielding layer with a one-layered structure according to an embodiment of the invention.
Figure 5B:
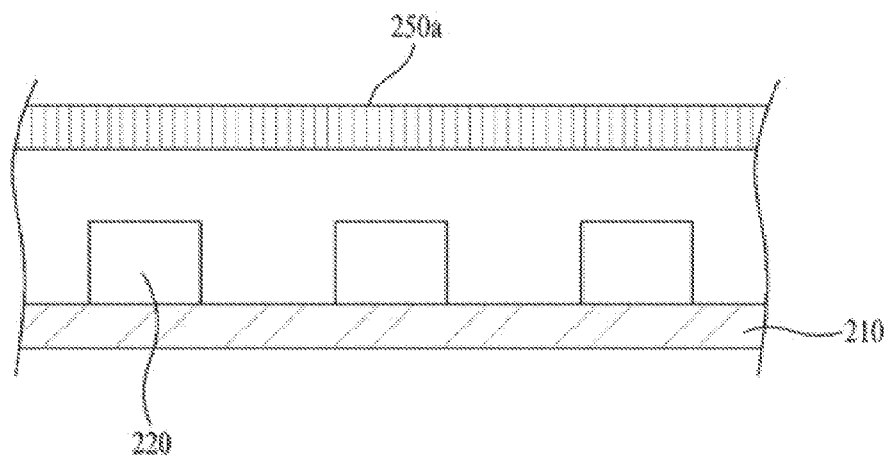
Figure 6A:
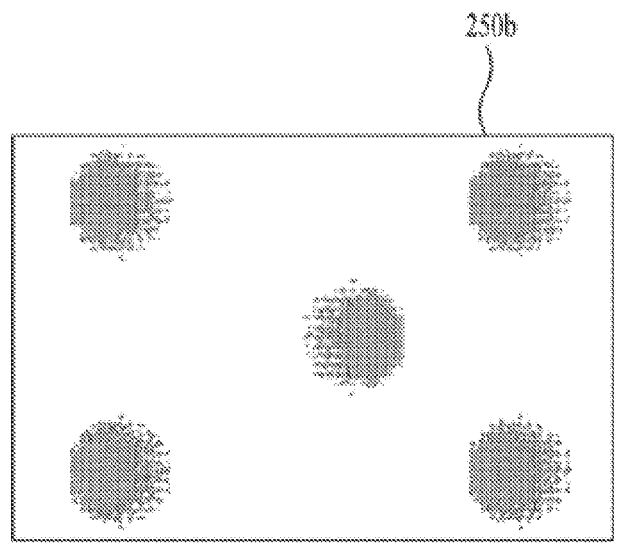
FIGS. 6A and 6B are respectively a plan view and a sectional view showing a light transmittance of a light shielding layer with a two-layered structure according to an embodiment of the invention.
Figure 6B:
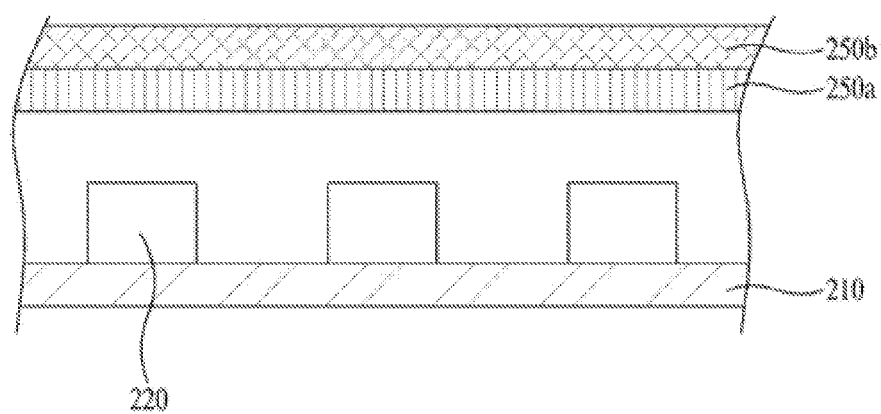
Figure 7A:
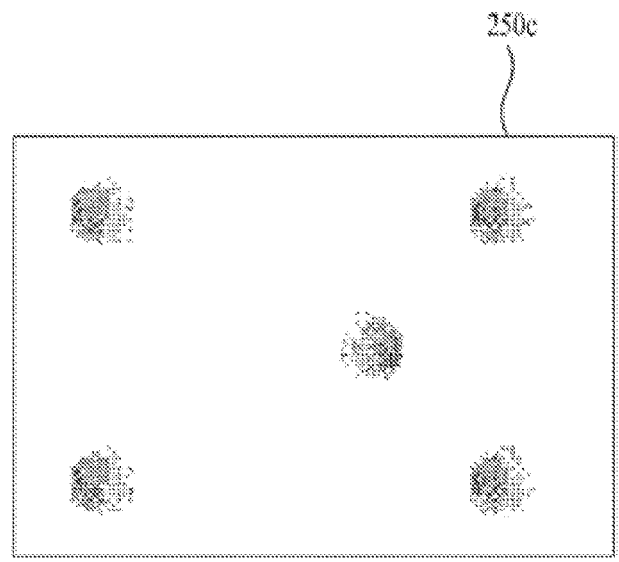
FIGS. 7A and 7B are respectively a plan view and a sectional view showing a light transmittance of a light shielding layer with a three-layered structure according to an embodiment of the invention.
Figure 7B:
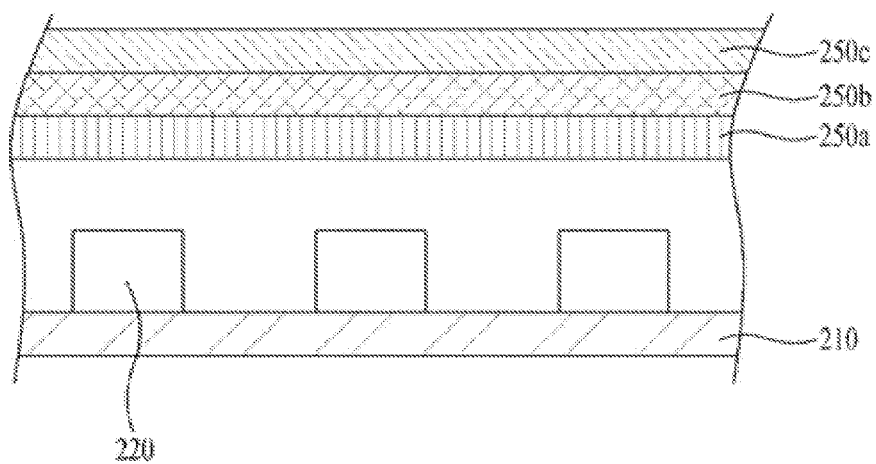

FIGS. 5A to 7B illustrate the light transmittances according to the thicknesses of the light shielding layer according to an embodiment of the invention. FIGS. 5A and 5B are respectively a plan view and a sectional view showing a light transmittance of a light shielding layer with a one-layered structure, FIGS. 6A and 6B are respectively a plan view and a sectional view showing a light transmittance of a light shielding layer with a two-layered structure, and FIGS. 7A and 7B are respectively a plan view and a sectional view showing a light transmittance of a light shielding layer with a three-layered structure.

As shown in FIGS. 5A and 5B, the area, of a light shielding layer 250a forming a one-layered structure, nearest to the light sources 220 has the highest light transmittance. As shown in FIGS. 6A and 6B, as the thickness of light shielding layers 250a and 250b forming a two-layered structure increases, the light transmittance of the same area is somewhat lowered. As shown in FIGS. 7A and 7B, the light transmittance at the same area of light shielding layers 250a, 250b, and 250c forming a three-layered structure is even lower.

Thus, because the light transmittance varies according to the thickness of the light shielding layer, a light shielding pattern may be formed by adjusting the thickness of the light shielding layer in order to obtain an effective distribution of light transmittance.

Among the light shielding layer, the area near the light sources needs a lower light transmittance and a color change rate of transmitted light must be minimized at the area, while the area away from the light sources needs a relatively high light transmittance. In order to implement a light shielding layer having such a light transmittance distribution, the adjustment of the thickness of the light shielding layer, as well as the light shielding pattern of a certain shape, is a key factor.

Thus, in manufacturing the light shielding layer according to an exemplary embodiment of the invention, its light transmittance can be adjusted by using the thickness of the light shielding layer as well as the form of the light shielding pattern.

FIGS. 8A to 8E are sectional views showing an example of a backlight unit having a light shielding layer with a three-layered structure according to an embodiment of the invention.

Figure 8A:
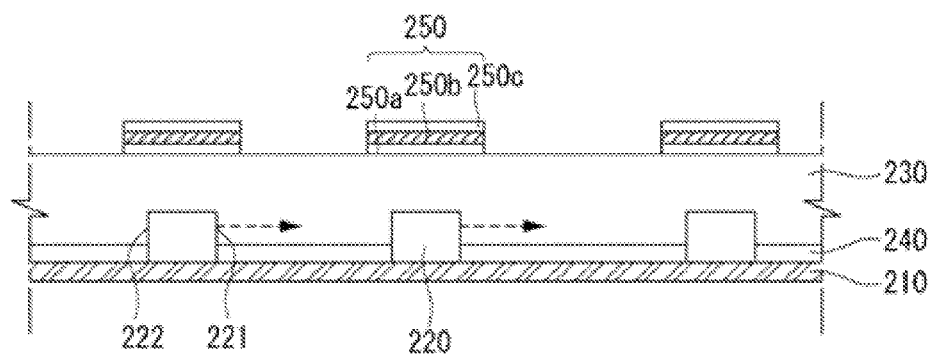
FIGS. 8A to 8E are sectional views showing an example of a backlight unit having a light shielding layer with a three-layered structure according to an embodiment of the invention.

As shown in FIG. 8A, a plurality of light shielding layers 250 may be positioned on the second layer 230 of the backlight unit 200 comprising the light sources 220.

In more detail, the plurality of light shielding layers 250 may be formed on the second layer 230 such that they correspond to the positions where the light sources 220 are disposed.

The light shielding layers 250 may comprise a first light shielding layer 250a, a second light shielding layer 250b, and a third light shielding layer 250c.

For example, the light shielding layers 250 may be formed on the second layer 230 such that the first light shielding layer 250a is positioned to be in contact with the second layer 230, the second light shielding layer 250b is positioned on (or in contact with) the first light shielding layer 250a, and the third light shielding layer 250c is positioned on (or in contact with) the second light shielding layer 250b.

The first light shielding layer 250a and the third light shielding layer 250c may be light shielding layers for shielding at least a portion of the light emitted from the light sources 220. The second light shielding layer 250b may be a reflection layer for reflecting at least a portion of the light emitted from the light sources 220.

Because the light shielding layers 250 are formed on the second layer 230, the luminance of light emitted from an area adjacent to the light sources 220 may be reduced, and accordingly, light of uniform luminance can be emitted from the backlight unit 200.

For example, the light shielding layers 250 are formed on the second layer 230 such that they correspond to the positions where the plurality of light sources 220 are disposed, to selectively shield or reflect light emitted upward from the light sources 220 to reduce the luminance of light emitted from the area adjacent to the light sources 220. And in this case, the reflected light may spread to the lateral side or in a downward direction. For instance, a middle of the light shielding layer(s) 250 is selectively positioned to be aligned with or substantially aligned with a middle of the light sources 220, or the light shielding layer(s) 250 are selectively positioned to generally correspond with the light sources 220.

The foregoing light shielding layers 250 may be formed by depositing or coating a metal oxide. Alternatively, the light shielding layers 250 may be formed by printing ink containing metal oxide, e.g., metal oxide ink, according to a predetermined pattern. In particular, the metal oxide ink may be whitish ink.

Here, in order to improve the light shielding effect of the first and third light shielding layers 250a and 250c, the first and third light shielding layers 250a and 250c may have a color with a high brightness, for example, a color close to white.

In this manner, the light shielding layer(s) 250 according to an exemplary embodiment of the invention serve to shield or reflect light emitted from the light sources 220, to make the luminance of the backlight unit uniform.

Figure 8B:
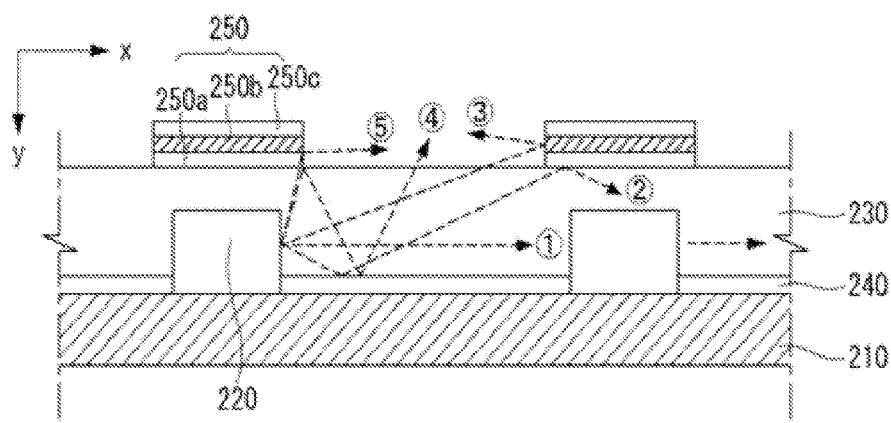

FIG. 8B illustrates examples of the path of light emitted from the light sources 220.

As shown in FIG. 8B, light ① emitted in a direction horizontal to the first layer 210, namely, in an x-axis direction, from the light source 220 may proceed toward the adjacent light source 220 and be reflected by the adjacent light source 220. Light ② emitted in the direction of the reflection layer 240 from the light source 220 may be reflected from the reflection layer 240 and then reflected from the first light shielding layer 250a to proceed to the interior of the second layer 230.

Also, light ③ emitted in an upward direction from the light source 220 may transmit through the second layer 230 so as to be reflected from the second light shielding layer 250b to proceed upward. Light ④ emitted in an upward direction from the light source 220 may be reflected from the first light shielding layer 250a disposed on the light source 220, from which the light has been emitted, to proceed toward the reflection layer 240 and then reflected again from the reflection layer 240 so as to proceed outwardly.

Light ⑤ emitted in the upward direction from the light source 220 may transmit through the first light shielding layer 250a disposed on the light source 220 and be reflected from the second light shielding layer 250b so as to proceed outwardly.

Namely, the light shielding layers 250 may reflect light made incident from the first to third light shielding layers 250a to 250c or may reflect a portion of incident light and allow a portion of the incident light to transmit therethrough.

The characteristics of the light shielding layers 250 may be adjusted by controlling the transmission of light through the second layer 230.

Accordingly, light emitted from the light source 220 can be widely reflected in the lateral direction and other directions so as to spread, rather than being concentrated to the upper side, and thus, uniform luminance can be achieved by using the backlight unit.

As shown in FIG. 8A, the first, second, and third light shielding layers 250a, 250b, and 250c of the light shielding layers 250 may have the same size and/or shape. Here, the size refers to the area on the plane of the first light shielding layer 250a, the second light shielding layer 250b, and the third light shielding layer 250c. In an example, the first, second, and third light shielding layers 250a, 250b, and 250c having the same size and shape are sequentially stacked on the second layer 230.

Meanwhile, the foregoing light shielding layers 250 may be positioned such that their center corresponds to the center of the light sources 220. The light shielding layers 250 may be formed to entirely cover the light sources 220 positioned at the lower side of the light shielding layers 250.

Light emitted from the light source 220 has the highest luminance at a light emitting surface 221 of the light source 220, so the light shielding layer 250 is positioned on the light emitting surface 221 of the light source 220 to reduce the luminance at the light emitting surface 221 of the light source 220. In addition, because each light source 220 emits light toward the adjacent light source 220, light reaching a rear surface 222 of the light source 220 is reflected from the light source or the reflection layer 240 adjacent to the light source 220, thus preventing an increase in the luminance at the rear surface 222 of the light source 220.

Thus, the light shielding layer 250 may be positioned to entirely cover the light emitting surface 221 and the rear surface 222 of the light source 220. Alternatively, the light shielding layer 250 may be positioned to be lopsided toward the direction in which light is emitted from the light source 220 in order to reduce the luminance at the light emitting surface 221 of the light source 220.

Figure 8C:
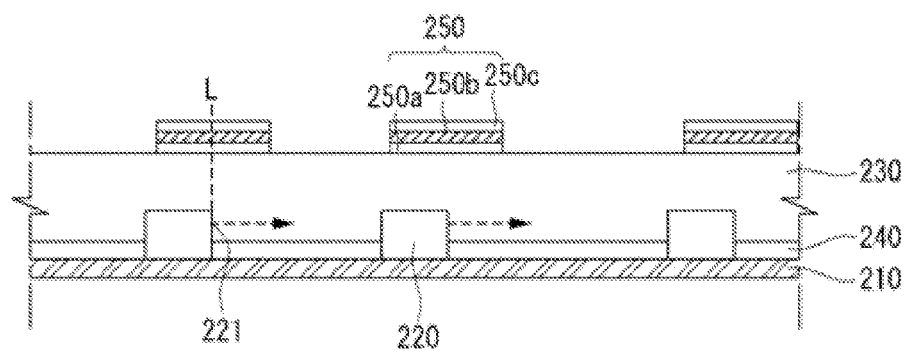

As shown in FIG. 8C, the light shielding layer 250 may be positioned such that the center of the light shielding layer 250 is consistent with (or aligned with) an extending line (L) of the light emitting surface 221 of the light source 220. Namely, compared with the light shielding layer 250 illustrated in FIG. 8A, the light shielding layer 250 illustrated in FIG. 8C is positioned to be off-centered more toward the light emitting surface 221 of the light source 220.

Figure 8D:
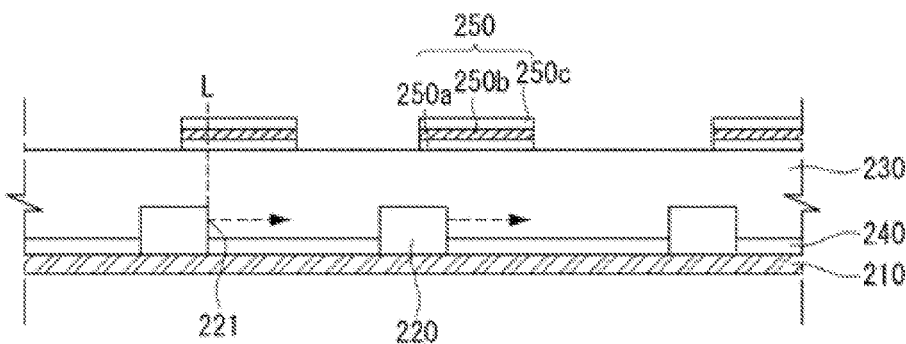

As shown in FIG. 8D, the light shielding layer 250 may be positioned such that the center of the light shielding layer 250 shifted a certain distance from the extending line (L) of the light emitting surface of the light source 220 in the direction in which light is emitted from the light source 220. Namely, the light shielding layer illustrated in FIG. 8D is more off-centered toward the direction in which light is emitted from the light source 220 (light emitting direction) than the light shielding layer illustrated in FIG. 8C.

Figure 8E:
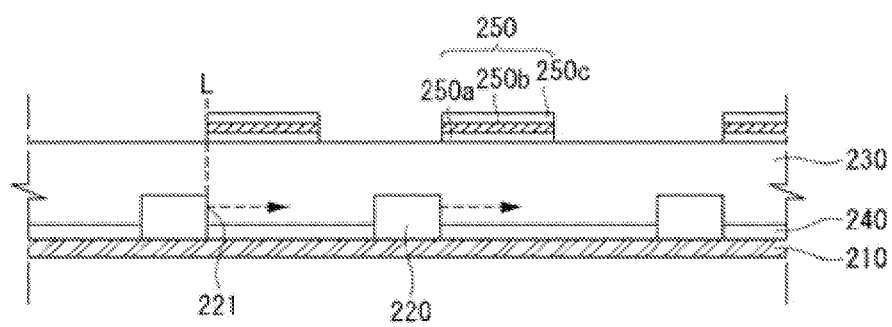

As shown in FIG. 8E, the light shielding layer 250 may be positioned such that the end of the light shielding layer 250 is consistent with (or aligned with the extending line (L) of the light emitting surface 221 of the light source. Namely, the light shielding layer illustrated in FIG. 8E is even more off-centered toward the direction in which light is emitted from the light source 220 than the light shielding layer illustrated in FIG. 8D.

Accordingly, the light shielding layer 250 can reduced the luminance at the area adjacent to the light emitting surface 221 of the light source 220, thus improving the uniformity of luminance of the backlight unit.

The foregoing light shielding layer having the three-layered structure may be formed on a transparent film so as to be provided in the backlight unit.

FIGS. 9(a)-9(c) are sectional views showing the sequential process of a method for manufacturing a backlight unit having a light shielding layer with a three-layered structure according to an embodiment of the invention.

The method for manufacturing the light shielding layer 250 will now be described as shown in FIGS. 9(a)-9(c). As shown in FIG. 9(a), the third light shielding layer 250c is formed on a transparent film 270 through a deposition, printing or coating method, the second light shielding layer 250b smaller than the third light shielding layer 250c is formed on the third light shielding layer 250c, and the first light shielding layer 250a is formed on the second light shielding layer 250b such that it encapsulates the second light shielding layer 250b. For instance, the second light shielding layer 250b is encapsulated by the first and third light shielding layers 250a and 250c.

As shown in FIG. 9(b), the light sources 220 and the light shielding layers 250 are aligned such that they correspond to each other at their positions, and the transparent film 270 with the light shielding layers 250 formed thereon is attached to the second layer 230, to form a backlight unit as shown in FIG. 9(c). Here, the light sources 220 and the light shielding layers 250 may correspond with each other as shown in FIGS. 8A-8E.

The backlight unit formed as discussed above comprises the first light shielding layer 250a formed on the second layer 230 and the second light shielding layer 250b covered by the third light shielding layer 250c. The third light shielding layer 250c may be positioned on the second light shielding layer 250b and the first light shielding layer 250a. The transparent film 270 may remain or may be removed later.

As shown in FIG. 9(c), certain edges of the first light shielding layer 250a are not in contact with the second layer 230, while other portions of the first light shielding layer 250a are in contact with the second layer 230 according to the degree of pressure applied to the transparent film 270. Further, in this example, a middle of the light shielding layer 250 may be aligned with or substantially aligned with a light emitting surface 221 of the corresponding light source 220.

The respective layers (e.g., two or more layers) constituting the light shielding layer may be made of different materials, or may be made of the same material.

Figure 10:
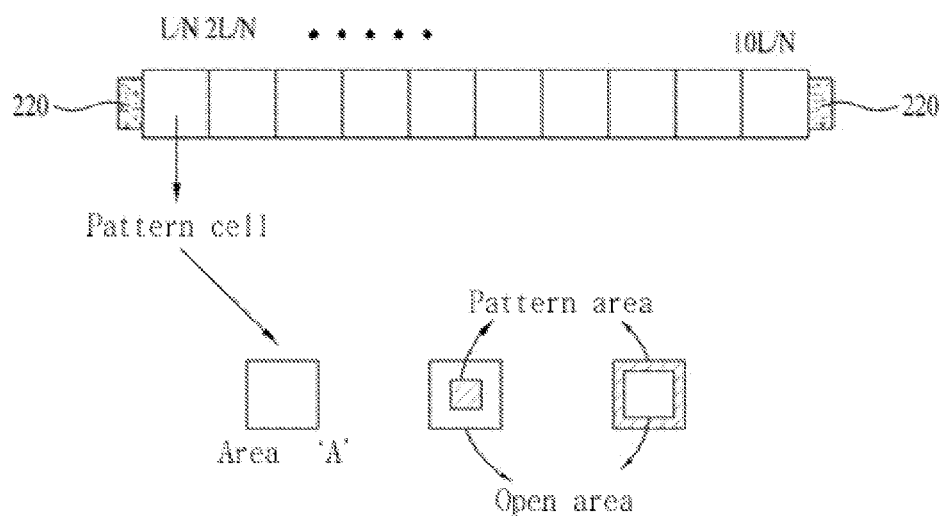
FIG. 10 is a view for explaining a light transmittance according to a light shielding pattern of a light shielding layer through a numerical expression according to an embodiment of the invention.

FIG. 10 is a view for explaining a light transmittance according to a light shielding pattern of a light shielding layer in a backlight unit through a numerical expression according to an embodiment of the invention. As shown in FIG. 10, when the area between the two adjacent light sources 220 is divided into 10 sections, each section may comprise a light shielding pattern having a certain shape according to a determined light transmittance.

When one of the 10 sections is a pattern cell, the pattern cell may have the area called 'A'. The pattern cell having the area 'A' may be an open area (Aopen) with a hole formed therein or a patterned area (Apatterned) having a light shielding pattern.

Thus, if the pattern cell having the area 'A' does not include a light shielding pattern, a light transmittance of the corresponding area is T(x)=open area of 'A' (Aopen)/entire area of 'A' (Acell).

The pattern cell having the area 'A' may comprise both an open area (Aopen) without a light shielding pattern and a patterned area (Apatterned) with a light shielding pattern.

Here, the patterned area (Apatterned) with a light shielding pattern may be positioned at a central portion or at an edge of the area 'A'.

When a pattern transmittance of the patterned area (Apatterned) with a light shielding pattern is Tpattern, a light transmittance of the pattern cell having the area 'A' with a light shielding pattern is T(x)=open area (Aopen) of 'A'/entire area (Acell) of 'A'+{patterned area (Aclosed) of 'A'*pattern transmittance (Tpattern)/entire area (Acell) of 'A'}.

Thus, when the light shielding pattern is formed on the light shielding layer, the light transmittance can be adjusted by using the equation as mentioned above.

Namely, when the light shielding pattern of the light shielding layer is manufactured, the light transmittance of the light shielding layer can be set in the order as follows.

First, because the light transmittance of each area of the light shielding layer is previously set, the light transmittance of the area where the light shielding pattern is to be formed is searched to be confirmed.

Next, the pattern area and open area of the corresponding area are determined by using the equation according to the pre-set light transmittance.

And then, a light shielding pattern is formed on the light shielding layer according to the determined pattern area and open area.

In this manner, in an exemplary embodiment of the invention, various light transmittances of the light shielding layer are determined according to the designing conditions of the backlight such as light sources, and the light shielding pattern of the light shielding layer is formed, thus manufacturing a backlight unit having the light shielding pattern that can adjust the brightness of light to be uniform and minimize a color change of transmitted light.

Figure 11A:
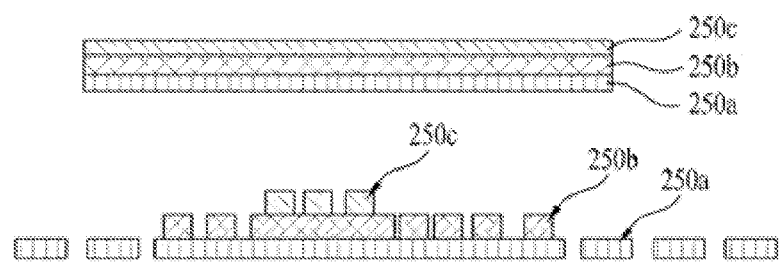
FIGS. 11A and 11B illustrate examples of light shielding layers having a light shielding pattern according to an embodiment of the invention.
Figure 11B:
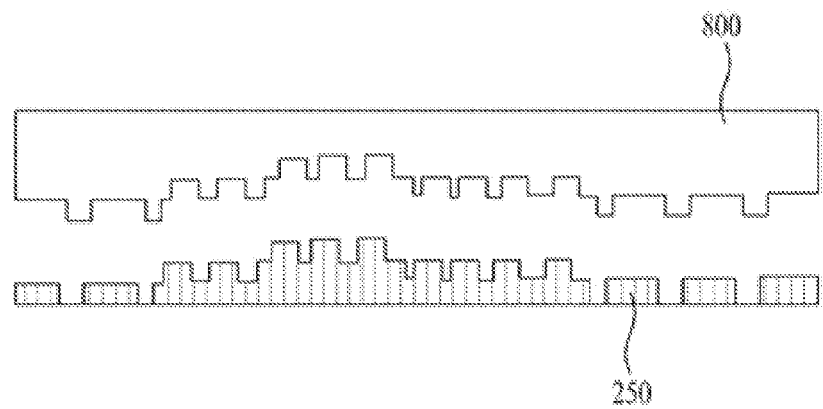

FIGS. 11A and 11B illustrate examples of light shielding layers having a light shielding pattern for use in a backlight unit according to an embodiment of the invention. Specifically, FIG. 11A illustrates a light shielding layer having a three-layered structure with a light shielding pattern in the form of holes, and FIG. 11B illustrates a light shielding layer having a one-layered structure with a light shielding pattern in the form of grooves. Such light shielding layers each can be disposed in the backlight unit in any manner discussed above.

As shown in FIG. 11A, the light shielding layer having a light shielding pattern in the form of holes may have the structure in which the first light shielding layer 250a, the second light shielding layer 250b, and the third light shielding layer 250c are stacked, but the light shielding layer may have a two-layered structure in which the first light shielding layer 250a and the second light shielding layer 250b are stacked, or may be formed as a single layer comprising only the first light shielding layer 250a according to circumstances.

In light shielding layer having the three-layered structure, the first light shielding layer 250a comprises a first area without a first light shielding pattern and a second area adjacent to an outer boundary of the first area and having the first light shielding pattern.

The second light shielding layer 250b may be formed on the first area of the first light shielding layer 250a and may comprise a third area without a second light shielding pattern and a fourth area adjacent to the outer boundary of the third area and having the second light shielding pattern.

The third light shielding layer 250c may be formed on the third area of the second layer 250b and comprise a fifth area with a third light shielding pattern.

Here, the light source may be positioned to correspond to the fifth area of the third light shielding layer 250c. The light shielding layer nearest to the light source may have the three-layered structure, which is the thickest, and the light shielding layer farthest from the light source may have a one-layered structure, which is the thinnest.

FIG. 11B illustrates the light shielding layer having the one-storied structure with a light shielding pattern in the form of recesses. As shown in FIG. 11B, the light shielding layer is configured as a single layer and may be formed such that its thickness is gradually reduced as the light shielding layer extends away from the light source, e.g., the thickness of the light shielding layer may decrease as the light shielding layer extends in the light emitting direction of the light source.

The light shielding pattern of the light shielding layer illustrated in FIG. 11B can be formed by using a mold 800 having a certain pattern. Namely, the pattern of the mold 800 can be transferred to the light shielding layer 250 to form the light shielding pattern.

In this case, the area near the light source may be thicker and have a recess-like light shielding pattern, while the area away from the light source may be thinner and have a recess or hole-like light shielding pattern. The recess-like light shielding pattern may have a surface with multiple indents, while the hole-like light shielding pattern may include through-holes within the pattern.

Figure 12A:
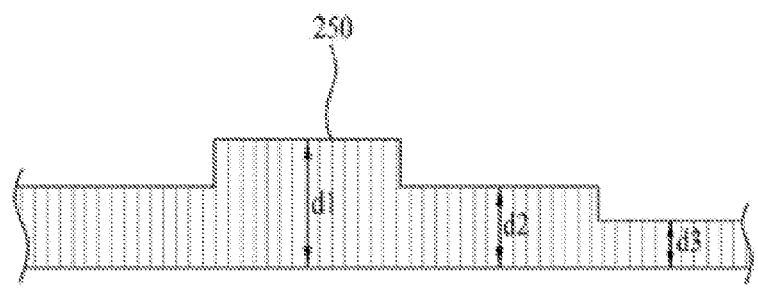
FIGS. 12A to 12C illustrate examples of a backlight unit having a light shielding layer according to a first exemplary embodiment of the invention.
Figure 12B:
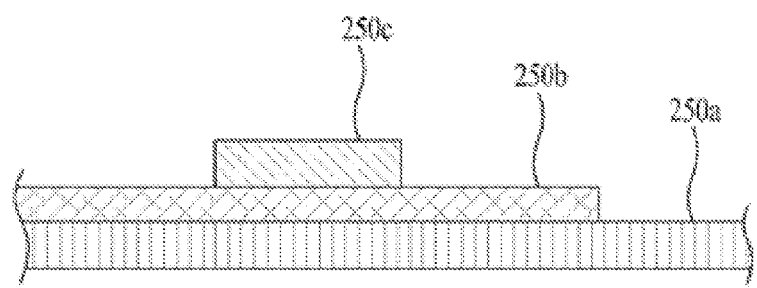
Figure 12C:
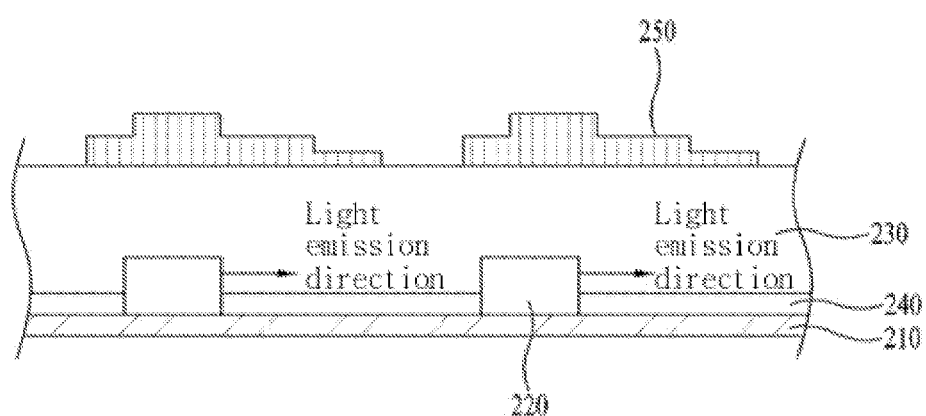

FIGS. 12A to 12C illustrate examples of a backlight unit having a light shielding layer according to a first exemplary embodiment of the invention. Specifically, FIG. 12A illustrates a light shielding layer having a single-layered structure with a light shielding pattern having a varying thickness, FIG. 12B illustrates a light shielding layer having a multi-layered structure with a light shielding pattern having a varying thickness, and FIG. 12C illustrates a backlight unit employing the light shielding layer with a different light shielding pattern having a different thickness. These light shielding layers allow a more uniform light emission from the entire area of the backlight unit.

As shown in FIG. 12A, the light shielding layer 250 having a single-layered structure may be manufactured such that respective areas have different thicknesses according to their light transmittance.

For instance, among the entire area of the light shielding layer 250, an area through which the brightest light transmits may have the largest thickness dl corresponding to a pertinent light transmittance so as to shield the largest amount of light, and an area through which the least amount of light transmits may have the smallest thickness d3 corresponding to a pertinent light transmittance so as to shield the smallest amount of light.

As shown in FIG. 12B, the light shielding layer 250 having a multi-layered structure comprising multiple layers may be manufactured such that one layer or multiple layers are stacked, which provides the light shielding layer 250 having a varying thickness according to a light transmittance of each area.

Namely, among the entire area of the light shielding layer 250, the first, second, and third light shielding layers 250a, 250b, and 250c may be stacked to have a varying thickness corresponding to a pertinent light transmittance at an area through which the brightest light may transmit so as to shield a largest amount of light, and only the first light shielding layer 250a may be formed to have the thickness corresponding to a pertinent light transmittance at an area through which the least amount of light may transmit so as to shield the smallest amount of light. For instance, the portion of the light shielding layer 250 having the thickness dl may be disposed to correspond with the corresponding light source 220.

The multi-layered structure of FIG. 12B may be advantageous in that each layer may be made of a different material and the light shielding layer 250 may have a different total thickness, so the light transmittance can be more finely adjusted compared with the single-layered structure. For instance, the portion of the light shielding layer 250 having the largest total thickness (e.g., where the layers 250a-250c are formed) may be disposed to correspond with the corresponding light source 220.

As shown in FIG. 12C, the light shielding layer 250 at the area nearest to the light source 220 is thicker, and the light shielding layer 250 at the area away from the light source 220 is thinner, thus uniformly adjusting the light transmittance.

In the first exemplary embodiment of the invention, an open area such as a hole or a recess may be formed on the light shielding layer 250 according to circumstances.

Here, the width of the open area may gradually increase or may be equal as the light shielding layer extends away from the light source.

Figure 13A:
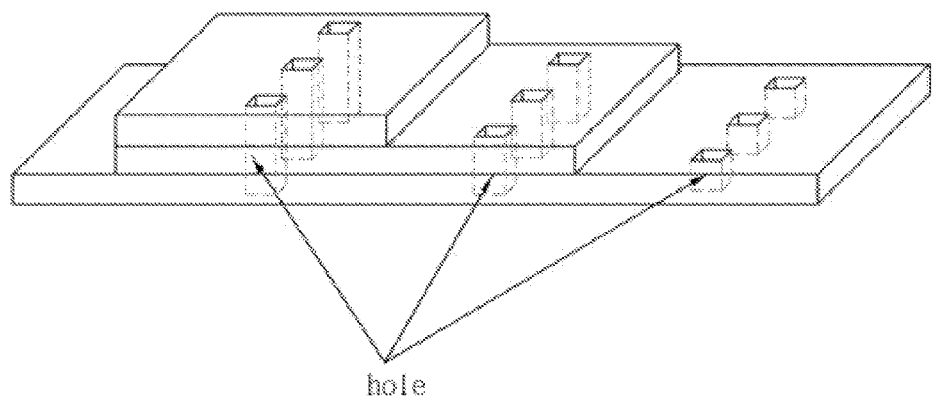
FIGS. 13A and 13B illustrate examples of holes or recesses formed on the light shielding layer according to the first exemplary embodiment of the invention.
Figure 13B:
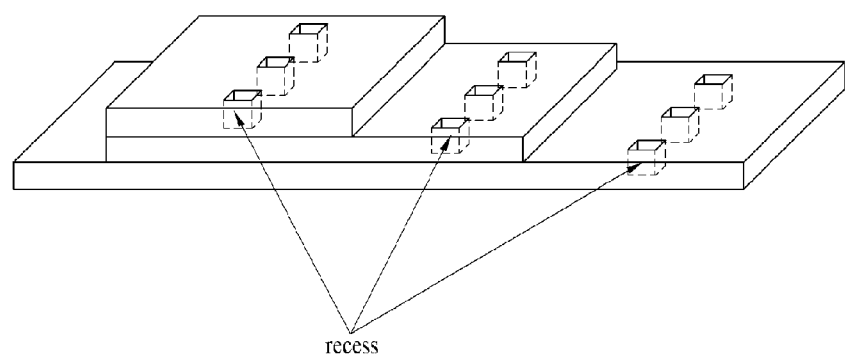

FIGS. 13A and 13B illustrate holes or recesses formed on the light shielding layer according to the first exemplary embodiment of the invention. As shown in FIGS. 13A and 13B, the depth of the hole or recess formed on the third light shielding layer 250c may be equal to a thickness value of the third light shielding layer 250c, may be equal to a thickness value obtained by adding the thicknesses of the second and third light shielding layers 250b and 250c, or may be equal to a thickness value obtained by adding the thicknesses of the first, second, and third light shielding layers 250a, 250b, and 250c.

The depth of the hole or recess formed on the second light shielding layer 250b may be equal to the thickness value of the second light shielding layer 250b or may be equal to a thickness value obtained by adding the thicknesses of the first and second light shielding layers 250a and 250b.

The depth of the hole or recess formed on the first light shielding layer 250a may be equal to a thickness value of the first light shielding layer 250a or smaller. For instance, in the example of FIG. 13A, all through holes are aligned and formed through the all the respective layers of the light shielding layer 250. In another example of FIG. 13B, through holes are formed only at a top layer of the respective layers of the light shielding layers 250. These through holes provide patterns for providing a more uniform light transmission.

Figure 14:
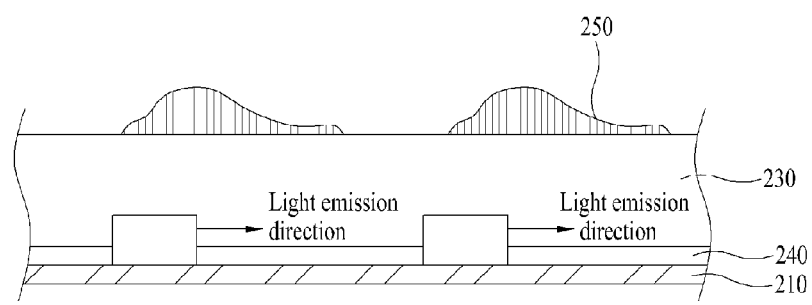
FIG. 14 illustrates a backlight unit having a light shielding layer according to a second exemplary embodiment of the invention.

FIG. 14 illustrates a backlight unit having a light shielding layer according to a second exemplary embodiment of the invention. In FIG. 14, the light shielding pattern of the light shielding layer 250 has an island-like shape.

As shown in FIG. 14, the light shielding layer 250 according to the second exemplary embodiment of the invention has such a form that the tilts at both sides are different. The light shielding layer at an area nearest to the light source 220 is thicker and has a tilt with a steep slope while the light shielding layer at an area distant from the light source 220 is thinner and has a tilt with a gentle slope, thus uniformly adjusting the light transmittance.

In the second exemplary embodiment of the invention, an open area such as a hole or a recess may be formed on the light shielding layer 250 according to circumstances. Here, the width of the open area may gradually increase or may be equal as the light shielding layer 250 extends away from the light source.

Figure 15A:
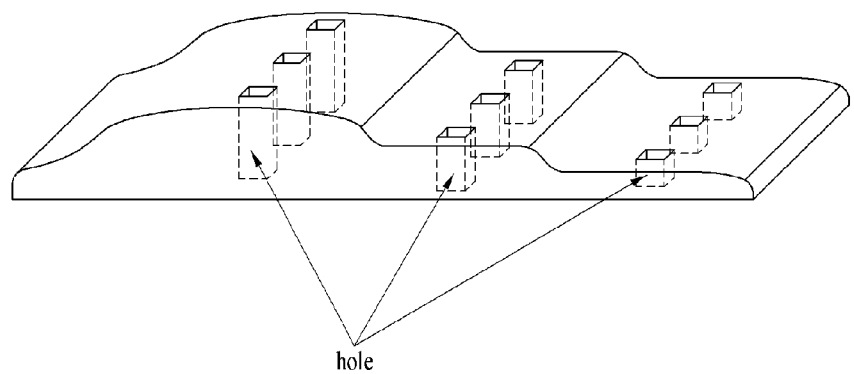
FIGS. 15A and 15B illustrate examples of holes or recesses formed on the light shielding layer according to the second exemplary embodiment of the invention.
Figure 15B:
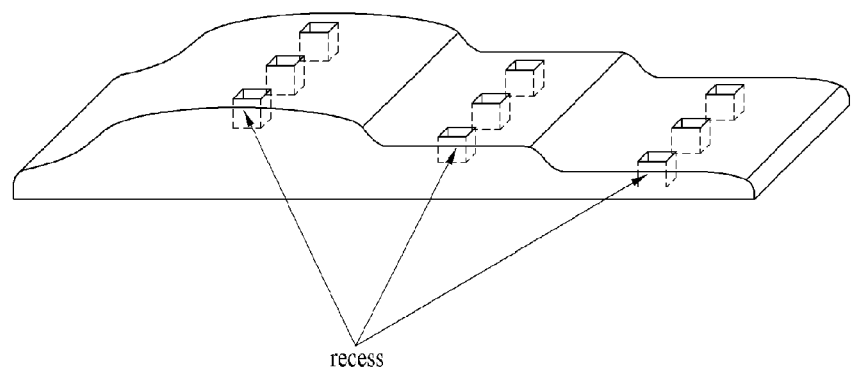

FIGS. 15A and 15B illustrate examples of holes or recesses formed on the light shielding layer according to the second exemplary embodiment of the invention. As shown in FIGS. 15A and 15B, the depth of the holes or recesses may vary depending on the thicknesses of the light shielding layer. Preferably, the portion of the light shielding layer that is the thickest may correspond with the respectively light source.

Figure 16A:
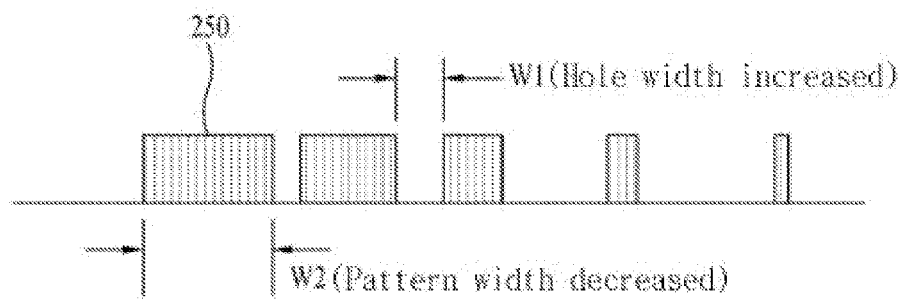
FIGS. 16A to 16C illustrate a backlight unit having a light shielding layer according to a third exemplary embodiment of the invention.
Figure 16B:
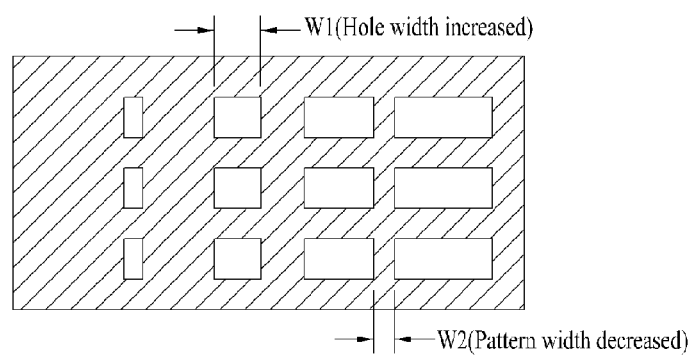
Figure 16C:
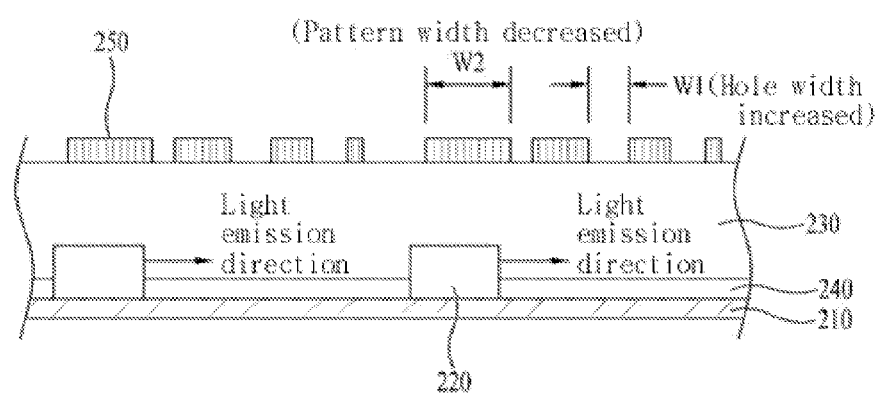

FIGS. 16A to 16C illustrate a backlight unit having a light shielding layer according to a third exemplary embodiment of the invention. Specifically, FIG. 16A illustrates a light shielding layer whose hole width and light shielding pattern width vary, FIG. 16B illustrates a plan view of the light shielding layer of FIG. 16A, and FIG. 16C illustrates a backlight unit employing the light shielding layer having the different hole widths and light shielding pattern widths.

In the third exemplary embodiment of the invention, as shown in FIGS. 16A to 16C, the hole widths w1 and the light shielding pattern widths w2 formed on the light shielding layer 250 vary as the light shielding layer 250 extends away from the light source 220.

Namely, the hole width w1 of the light shielding layer 250 gradually increases as the light shielding layer extends away from the light source 220, and at the same time the light shielding pattern width w2 of the light shielding layer 250 gradually decreases as the light shielding layer extends away from the light source 220. In an example, the portion of the light shielding layer 250 that has a larger width w2 would be positioned to correspond with the light source 220 as shown in FIG. 16C.

In the third exemplary embodiment of the invention, the light shielding layer 250 may be a single layer or may be configured as a plurality of layers comprising at least two or more layers, according to circumstances.

Figure 17A:
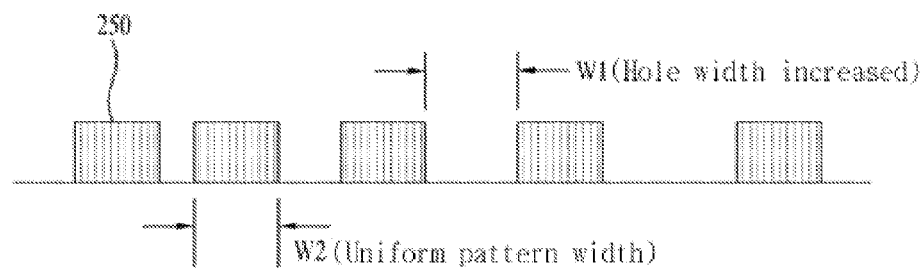
FIGS. 17A to 17C illustrate a backlight unit having a light shielding layer according to a fourth exemplary embodiment of the invention.
Figure 17B:
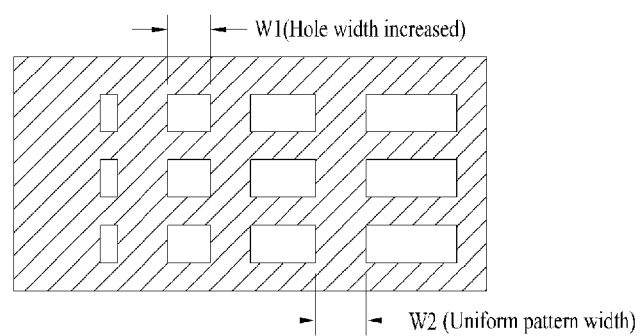
Figure 17C:
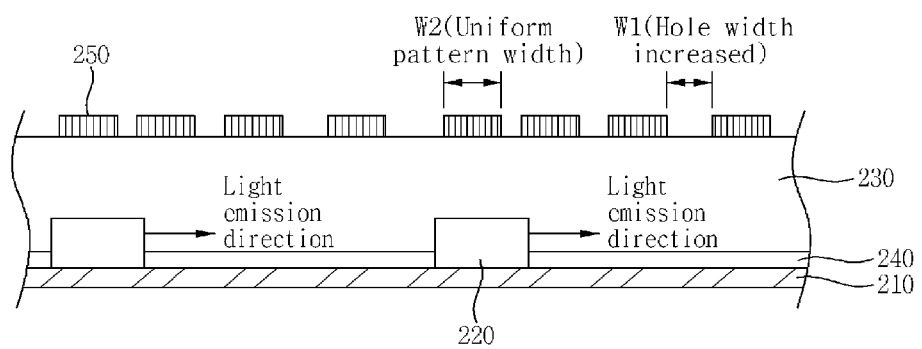

FIGS. 17A to 17C illustrate a backlight unit having a light shielding layer according to a fourth exemplary embodiment of the invention. Specifically, FIG. 17A illustrates a light shielding layer whose light shielding pattern width is uniform and hole width varies, FIG. 17B is a plan view of the light shielding layer of FIG. 17A, and FIG. 17C illustrates a backlight unit employing the light shielding layer whose light shielding pattern width is uniform and hole width varies.

In the fourth exemplary embodiment of the invention, as shown in FIGS. 17A to 17C, the hole width w1 formed on the light shielding layer 250 varies as the light shielding layer 250 extends away from the light source 220, while the light shielding pattern width w2 is uniform.

Namely, the hole width w1 of the light shielding layer 250 gradually increases as the light shielding layer 250 extends away from the light source 220, while the light shielding pattern width w2 of the light shielding layer 250 is uniform although the light shielding layer 250 extends away from the light source 220.

In the fourth exemplary embodiment of the invention, the light shielding layer 250 may be a single layer or may be configured as a plurality of layers comprising at least two or more layers, according to circumstances.

Figure 18A:
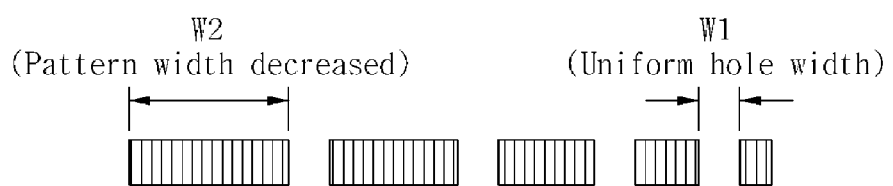
FIGS. 18A to 18C illustrate a backlight unit having a light shielding layer according to a fifth exemplary embodiment of the invention.
Figure 18B:
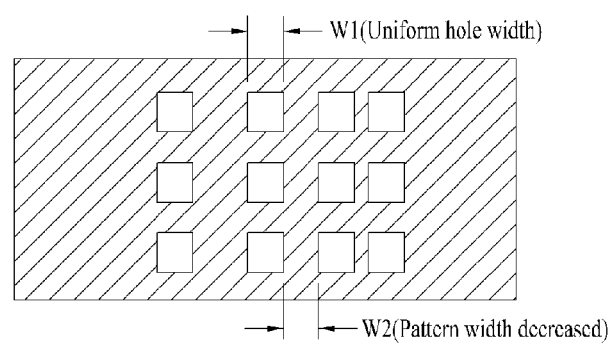
Figure 18C:
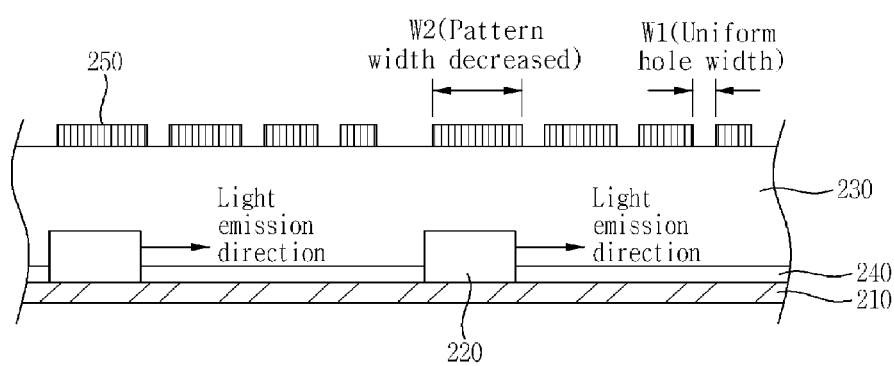

FIGS. 18A to 18C illustrate a backlight unit having a light shielding layer according to a fifth exemplary embodiment of the invention. Specifically, FIG. 18A illustrates a light shielding layer whose hole width is uniform and light shielding pattern width varies, FIG. 18B is a plan view of the light shielding layer of FIG. 18A, and FIG. 18C illustrates a backlight unit employing the light shielding layer whose hole width is uniform and light shielding pattern width varies.

In the fifth exemplary embodiment of the invention, as shown in FIGS. 18A to 18C, the light shielding pattern width w2 formed on the light shielding layer 250 varies as the light shielding layer 250 extends away from the light source 220, while the hole width w1 is uniform.

Namely, the light shielding pattern width w2 of the light shielding layer 250 gradually decreases as the light shielding layer 250 extends away from the light source 220, while the hole width w1 of the light shielding layer 250 is uniform although the light shielding layer 250 extends away from the light source 220.

In the fifth exemplary embodiment of the invention, the light shielding layer 250 may be a single layer or may be configured as a plurality of layers comprising at least two or more layers, according to circumstances.

Figure 19A:
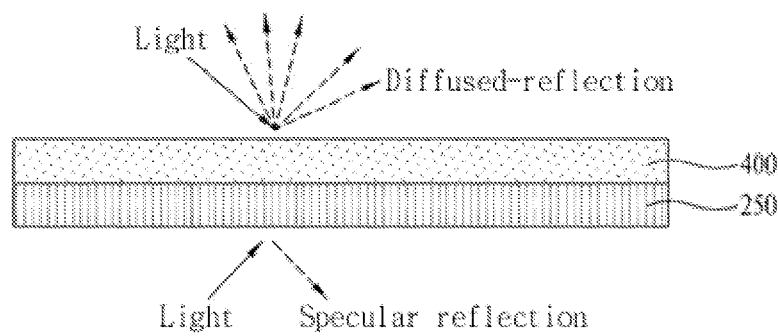
FIGS. 19A and 19B illustrate examples of a backlight unit having a light shielding layer according to a sixth exemplary embodiment of the invention.
Figure 19B:
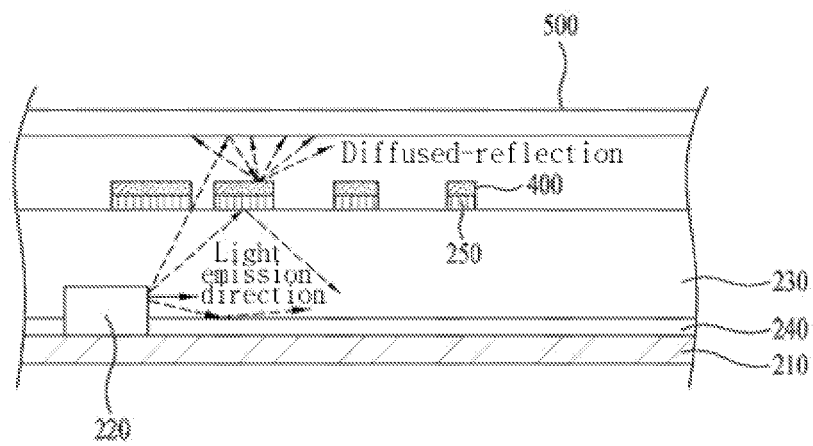

FIGS. 19A and 19B illustrate a backlight unit having a light shielding layer according to a sixth exemplary embodiment of the invention. Specifically, FIG. 19A illustrates the reflection characteristics of light reflected from upper and lower portions of a light shielding layer, and FIG. 19B illustrates a backlight unit employing the light shielding layer having different reflection characteristics of light at the upper and lower portions thereof.

In the sixth exemplary embodiment of the invention, as shown in FIGS. 19A and 19B, the light shielding layer may additionally comprise a reflective film 400 formed on the light shielding layer 250. That is, the light shielding layer of the invention may include the reflective film 400 and the light shielding layer discussed above.

Here, the reflective film 400 may be made of a material that can diffused-reflect incident light. For example, the reflective film 400 may be formed as a white ink thin film or the like. Namely, the light shielding layer 250 illustrated in FIG. 19A may be fowled as a metal thin film layer having a high reflectance to specular-reflect an incident light, and the reflective film 400 formed on the light shielding layer 250 may diffuse the reflected incident light.

As shown in FIG. 19B, when the light shielding layer 250 with the reflective film 400 formed thereon is applied to the backlight unit, light outputted from the light source 220 transmits through the hole or pattern of the light shielding layer 250, is reflected from the optical sheet 500 positioned at the upper side, and is then made incident to the reflective film 400. Then the light made incident to the reflective film 400 is diffused and/or reflected by the reflective film 400 so as to be uniformly diffused.

Accordingly, the light shielding layer 250 with the reflective film 400 formed thereon renders a point source of light be a surface light source, which is somewhat advantageous compared with the light shielding layer 250 without the reflective film 400.

In this manner, the light shielding layers having various structures can be manufactured in various manners according to the invention.

Figure 20A:
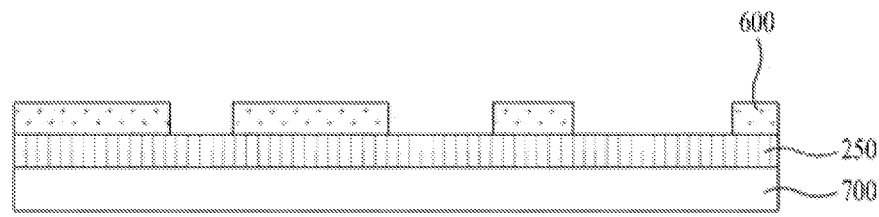
FIGS. 20A to 20C are sectional views showing sequential processes of a method for manufacturing a light shielding layer according to the first exemplary embodiment of the invention.
Figure 20B:
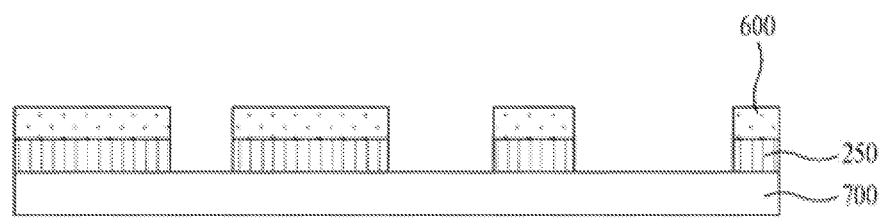
Figure 20C:
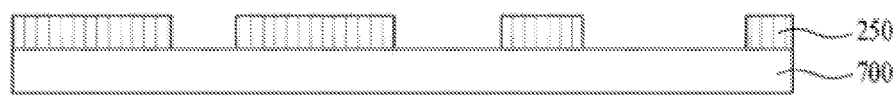

FIGS. 20A to 20C are sectional views showing sequential processes of a method for manufacturing a light shielding layer according to the first exemplary embodiment of the invention.

In the first exemplary embodiment of the invention, as shown in FIG. 20A, first, the light shielding layer 250 is formed on a substrate 700, and a mask layer 600 is formed on the light shielding layer 250.

Here, the light shielding layer 250 may be a metal layer, and the mask layer 600 may be made of a material that does not react to an etchant of the light shielding layer 250. For example, when the light shielding layer 250 is made of a metal, the mask layer 600 may be white ink comprising organic and inorganic particles.

Next, the mask layer 600 is patterned according to a light shielding pattern desired to be formed to expose portions of the light shielding layer 250. Here, the light shielding patterns discussed above can be used.

And then, as shown in FIG. 20B, the exposed portions of the light shielding layer 250 are etched to be removed by using the patterned mask layer 600 as a mask.

Thereafter, as shown in FIG. 20C, the remaining mask layer 600 is removed to form the light shielding layer 250 having the light shielding pattern.

The process of FIG. 20C may not be performed to leave the mask layer 600 on the light shielding layer 250, rather than being removed, according to circumstances. A reason that this may be desired is because when the mask layer 600 is formed as a reflective film such as white ink, the mask layer 600 may be left as it is on the light shielding layer 250 to serve to diffuse-reflect the light made incident to the mask layer 600, in the similar manner as in the sixth exemplary embodiment of the invention.

In this manner, the method for manufacturing the light shielding layer according to the first exemplary embodiment of the invention uses the chemical etching process combined with the photoresist process.

Figure 21A:
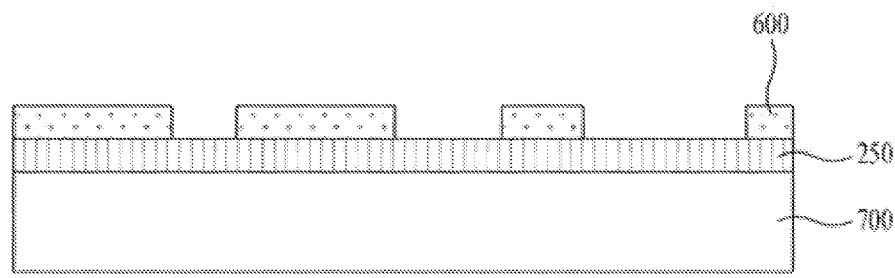
FIGS. 21A to 21C are sectional views showing sequential processes of a method for manufacturing a light shielding layer according to the second exemplary embodiment of the invention.
Figure 21B:
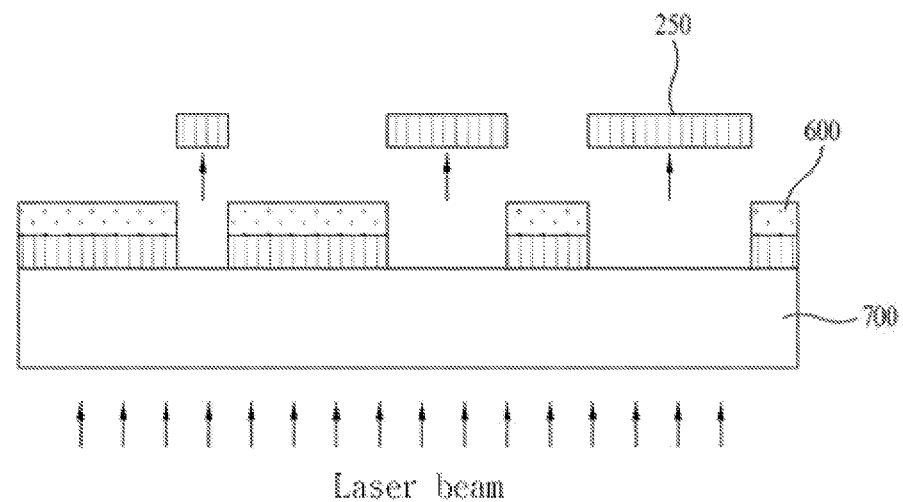
Figure 21C:
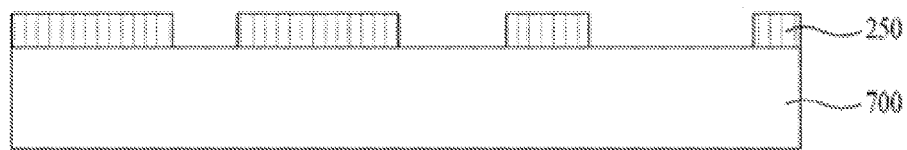

FIGS. 21A to 21C are sectional views showing sequential processes of a method for manufacturing a light shielding layer according to the second exemplary embodiment of the invention.

In the method for manufacturing a light shielding layer according to the second exemplary embodiment of the invention, patterning is performed by using a pulse laser. A basic mechanism is that a light absorption material absorbs a pulse laser to cause an instantaneous thermal expansion, and the light absorption material is then separated from the substrate due to such a rapid thermal expansion.

The process is a direct photoetching process that does not require the photoresist process and the chemical etching process. In the direct photoetching process, sufficient interaction must be made between the laser beam and the light absorption material and the phenomenon must occur within a short time.

In the second exemplary embodiment of the invention, first, as shown in FIG. 21A, the light shielding layer 250 and the mask layer 600 are sequentially formed on the substrate 700, and the mask layer 600 is patterned according to a light shielding pattern desired to be formed, to expose portions of the light shielding layer 250.

Next, as shown in FIG. 21B, a pulse laser is irradiated to the opposite surface of the light-transmissive substrate 700 with the light shielding layer 250 formed thereon. Here, the light shielding layer 250 is made of a light absorption material that absorbs the laser beam, and accordingly, the laser beam which has passed through the light-transmissive substrate 700 is absorbed by the light shielding layer 250.

The light shielding layer 250 is instantly thermally expanded and, in this case, the relatively thinner portions of the light shielding layer 250, e.g., the portions exposed from the mask layer 600, are detached from the substrate 700 as shown.

And then, as shown in FIG. 21C, the remaining mask layer 600 is removed to form the light shielding layer 250 having the light shielding pattern. In a variation, the process of FIG. 21C may not be performed and the mask layer 600 may be maintained on the light shielding layer 250 as it is, rather than being removed, according to circumstances. A reason for this may be because when the mask layer 600 is formed as a reflective film such as white ink, the mask layer 600 may be maintained as it is to serve to diffuse-reflect the light made incident to the mask layer 600, in the similar manner as in the sixth exemplary embodiment of the invention.

In this manner, the method for manufacturing the light shielding layer according to the second exemplary embodiment of the invention uses the physical etching process combined with the photoresist process and the pulse laser patterning process.

Figure 22A:
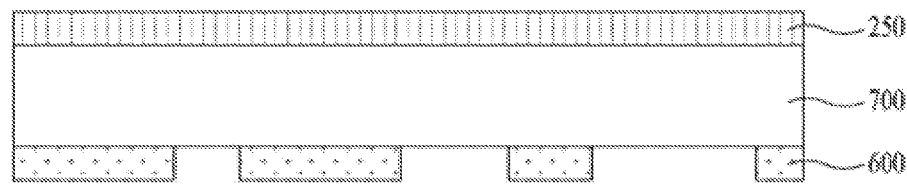
FIGS. 22A to 22C are sectional views showing sequential processes of a method for manufacturing a light shielding layer according to the third exemplary embodiment of the invention.
Figure 22B:
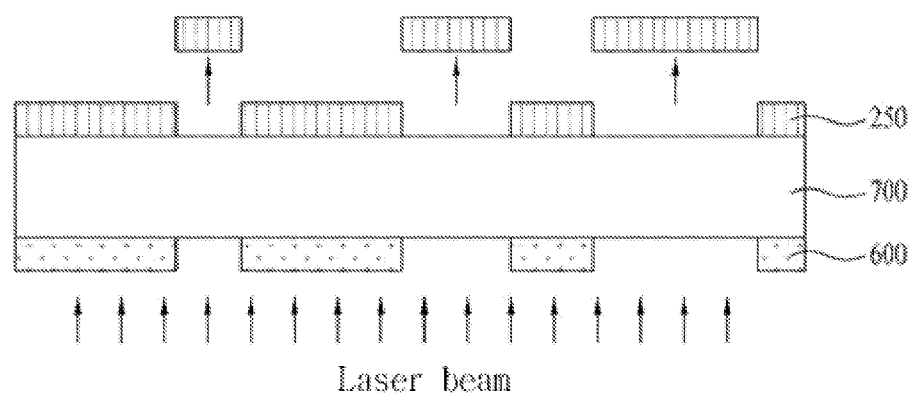
Figure 22C:
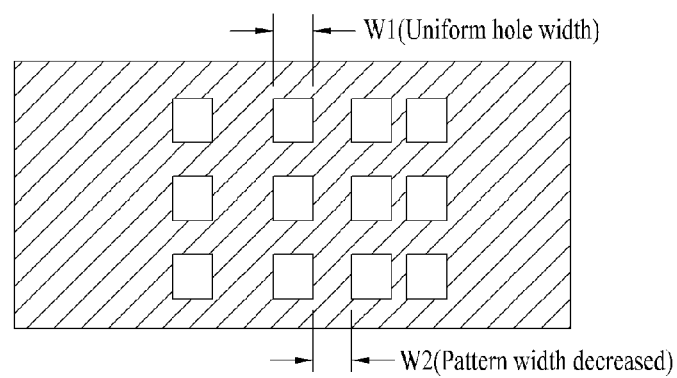

FIGS. 22A to 22C are sectional views showing sequential processes of a method for manufacturing a light shielding layer according to the third exemplary embodiment of the invention.

In the third exemplary embodiment of the invention, first, as shown in FIG. 22A, the light shielding layer 250 is formed on the light-transmissive substrate 700, and the mask layer 600 is formed on the opposite side of the light-transmissive substrate 700 on which the light shielding layer 250 is formed.

Next, the mask layer 600 is patterned according to a light shielding pattern desired to be formed to expose portions of the light shielding layer 250.

And then as shown in FIG. 22B, a pulse laser is irradiated to the light-transmissive substrate 700 with the mask layer 600 formed thereon by using the mask layer 600 as a mask. Here, the light shielding layer 250 is made of a light absorption material that absorbs the laser beam, and accordingly, the laser beam which has passed through the light-transmissive substrate 700 is absorbed by the light shielding layer 250. The portions of the light shielding layer 250 which have absorbed the laser beam are instantly thermally expanded and then detached from the substrate 700.

Thereafter, as shown in FIG. 22C, the remaining mask layer 600 is removed to form the light shielding layer 250 having the light shielding pattern.

The process of FIG. 22C may not be performed to leave the mask layer 600 as it is, rather than being removed, according to circumstances.

In this manner, the method for manufacturing the light shielding layer according to the third exemplary embodiment of the invention uses the physical etching process combined with the photoresist process and the pulse laser patterning process.

FIG. 23 illustrates a display module comprising a backlight unit according to an exemplary embodiment of the invention.

Figure 24:
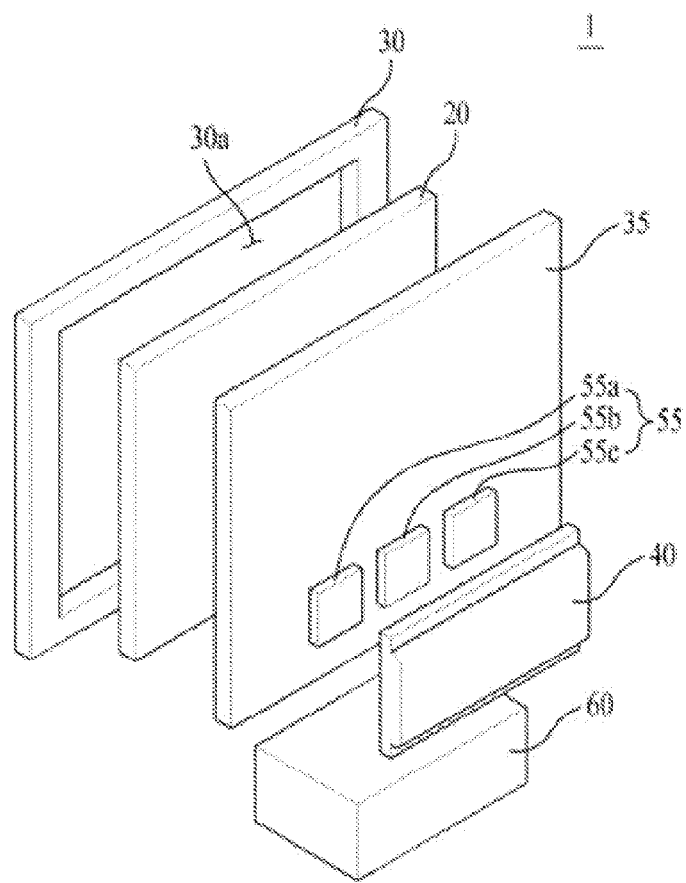
FIGS. 24 and 25 illustrate examples of a display device including a backlight unit according to an exemplary embodiment of the invention.

As shown in FIG. 23, a display module (e.g., a display module 20 as shown in FIG. 24) may comprise the display panel 100 and the backlight unit 200.

The display panel 100 comprises a color filter substrate 110 and a thin film transistor (TFT) substrate 120 attached in a facing manner with a cell gap maintained therebetween, and a liquid crystal layer may be interposed between the two substrates 110 and 120.

The color filter substrate 110 may comprise a plurality of color filters comprising red (R), green (G), and blue (B) color filters, and generate an image corresponding to the red, green, and blue color when light is applied thereto.

The color filters may comprise the red, green, and blue color filters, but without being limited thereto, red, green, blue, and white (W) subpixels may constitute a single pixel and thus different color filters may be used.

The TFT substrate 120 comprises switching elements (e.g., TFTs) to switch pixel electrodes. For example, a common electrode and pixel electrodes may vary the alignment of liquid crystal molecules of the liquid crystal layer according to a certain voltage applied from an external source.

The liquid crystal layer comprises a plurality of liquid crystal molecules, and the alignment of the liquid crystal molecules may be changed according to a voltage difference between the pixel electrodes and the common electrode. Accordingly, light provided from the backlight unit 200 may be made incident to the color filter substrate 110 correspondingly according to the change in the alignment of the liquid crystal molecules of the liquid crystal layer.

An upper polarizer 130 and a lower polarizer 140 may be disposed on the upper and lower sides of the display panel 100, respectively. Specifically, the upper polarizer 130 may be disposed on an upper surface of the color filter substrate 110, and the lower polarizer 140 may be disposed on a lower surface of the TFT substrate 120.

Although not shown, gate and data driving units may be provided to the side of the display panel 100 in order to generate driving signals for driving the panel 100.

As shown in FIG. 23, the display module according to an exemplary embodiment of the invention may be configured such that the backlight unit 200 is tightly attached to the display panel 100. For example, the backlight unit 200 may be fixedly bonded to a lower side of the display panel 100, e.g., to the lower polarizer 140, for which an adhesive layer may be formed between the lower polarizer 140 and the backlight unit 200.

Because the backlight unit 200 is tightly attached to the display panel 100, the overall thickness of the display device can be reduced to improve the external appearance of the display device, and because an additional structure for fixing the backlight unit 200 may be omitted, the structure and manufacturing process of the display device can be simplified.

Also, because there is no space between the backlight unit 200 and the display panel 100, malfunctions of the display device otherwise caused by an infiltrated debris into such a space or degradation of the picture quality of a display image can be prevented or reduced.

The backlight unit 200 according to an exemplary embodiment of the invention may be configured by stacking a plurality of function layers, and at least one of the plurality of function layers may comprise a plurality of light sources. Various examples of the light sources discussed above can be used.

In addition, in order for the backlight unit 200 to be tightly attached to be fixed to the lower surface of the display panel 100, the backlight unit 200, e.g., the plurality of function layers constituting the backlight unit 200 may be made of a flexible material.

The display panel 100 according to an exemplary embodiment of the invention may be divided into a plurality of areas, and the brightness of light emitted from a corresponding area of the backlight unit 200, namely, the brightness of a corresponding light source, may be adjusted according to a gray peak value of each of the divided areas or a color coordinates signal, thus adjusting the luminance of the display panel 100. To this end, the backlight unit 200 may be divided into a plurality of division driving areas which correspond to the divided areas of the display panel 100, respectively, so as to operate. For instance, the backlight unit can be divided into regions which can be selectively and independently driven, e.g., turned on/off, provide dimmed light, etc.

Figure 25:
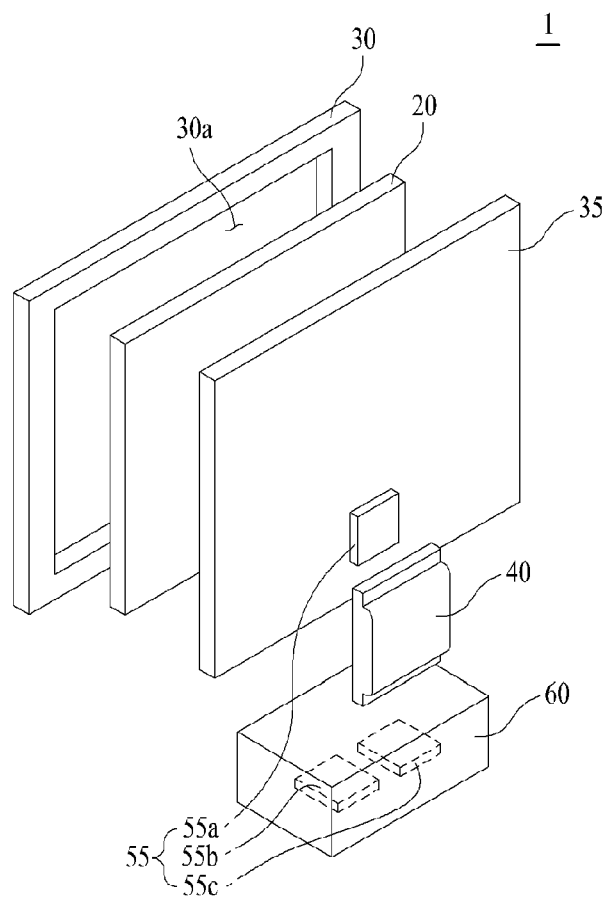

FIGS. 24 and 25 illustrate a display device according to an exemplary embodiment of the invention. Here, the display module 20 includes any backlight unit discussed above and a display panel to which the light from the backlight unit is applied.

As shown in FIG. 24, a display device 1 according to an exemplary embodiment of the invention may comprise a display module 20, a front cover 30 and a back cover 35 that covers the display module 20, a driving unit 55 provided on the back cover 35, and a driving unit cover 40 that covers the driving unit 55.

The front cover 30 may comprise a front panel made of a transparent material allowing light to transmit therethrough. The front panel protects the display module 20 at a certain distance and allows light emitted from the display module 20 to transmit therethrough so that an image displayed on the display module 20 can be seen from the outside.

The front cover 30 may be formed of a flat plate without a window 30a. In this case, the front cover 30 may be made of a transparent material allowing light to transmit therethrough. For example, the front cover 30 may be made of injection-molded plastic. When the front cover 30 is formed of a flat plate, the front cover 30 does not need to have a frame.

The back cover 35 may be coupled with the front cover 30 to protect the display module 20. The driving unit 55 may be disposed on one surface of the back cover 35. The driving unit 55 may comprise a driving controller 55a, a main board 55b, and a power supply unit 55c.

The driving controller 55a, which may be a timing controller, controls an operation timing of each driver IC of the display module 20. The main board 55b transfers V SYNC, H SYNC, R, G, and B resolution signals, and other signals to the timing controller. The power supply unit 55c applies power to the display module 20. The driving unit 55 may be provided on the back cover 35 and covered by the driving unit cover 40.

The back cover 35 comprises a plurality of holes to allow the display module 20 and the driving unit 55 to be connected to each other. A stand 60 may be provided to support the display device 1.

As shown in FIG. 24, the driving controller 55a of the driving unit 55 may be provided on the back cover 35, and the main board 55b and the power supply unit 55c may be provided at the stand 60. The driving unit cover 40 may cover only the driving unit 55 formed at the back cover 35.

In the present exemplary embodiment, the main board 55b and the power supply unit 55c are separately configured, but the invention is not meant to be limited thereto and the main board 55b and the power supply unit 55c may be configured as a single integrated board.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light generating device comprising:
   a base layer;
   a plurality of light source devices disposed on the base layer and configured to emit light, the light source devices being spaced apart from each other, at least one of the light source devices including a light emitting diode for generating the light; and
   a light shielding layer covering the light source devices and configured to control an amount of the light being transmitted through the light shielding layer,
   wherein the light shielding layer includes:
   a plurality of slits disposed spaced apart from each other, and
   a plurality of light shielding layer patterns defined by the slits, and being used to reflect the light impinging thereon, and
   wherein the light shielding layer patterns respectively correspond to the light source devices,
   wherein at least a portion of one of the slits is disposed above each of the light source devices, and
   wherein a width of each of the slits for a specific one of the light source devices increases as the corresponding slits move further from the specific one of the light source devices.

2. The light generating device of claim 1, wherein a portion of the corresponding light shielding layer pattern that is disposed directly above each of the light source devices is off centered from the corresponding light source device.

3. The light generating device of claim 1, further comprising:
   a reflective layer disposed on the base layer and provided between the light source devices.

4. The light generating device of claim 3, further comprising:
   a material disposed between the light shielding layer and the reflective layer so as to provide a set distance between the light shielding layer and the reflective layer.

5. The light generating device of claim 4, further comprising:
   an optical sheet disposed above the light shielding layer and covering the light shielding layer.

6. The light generating device of claim 3, further comprising:
   an optical sheet disposed above the light shielding layer and covering the light shielding layer.

7. The light generating device of claim 1, wherein the plurality of light source devices are arranged in multiple lines.

8. A display device comprising:
   a display panel configured to display images; and
   a backlight unit including the light generating device of claim 1 and configured to supply the light from the light generating device to the display panel.

9. The display device of claim 8, wherein the plurality of light source devices in the backlight unit extend in arrays and correspond to a display area of the display panel.

10. The display device of claim 8, wherein in the light generating device, a portion of the corresponding light shielding layer pattern that is disposed directly above each of the light source devices is off centered from the corresponding light source device.

11. The display device of claim 8, the light generating device further comprising:
    a reflective layer disposed on the base layer and provided between the light source devices.

12. The display device of claim 11, the light generating device further comprising:
    a material disposed between the light shielding layer and the reflective layer so as to provide a set distance between the light shielding layer and the reflective layer.

13. The display device of claim 12, the light generating device further comprising:
    an optical sheet disposed above the light shielding layer and covering the light shielding layer.

14. The display device of claim 11, the light generating device further comprising:
    an optical sheet disposed above the light shielding layer and covering the light shielding layer.

15. The display device of claim 1, wherein a width of the slit adjacent to a light emitting surface of the specific one of the light source devices is smaller than a width of the slit distanced from the light emitting surface of the specific one of the light source devices in a light travelling direction of the specific one of the light source devices.

* * * * *